(12) United States Patent
Kahle et al.

(10) Patent No.: US 10,929,700 B2
(45) Date of Patent: *Feb. 23, 2021

(54) IMAGE MARK SENSING SYSTEMS AND METHODS

(71) Applicant: e-Image Data Corp., Hartford, WI (US)

(72) Inventors: Todd Kahle, Hartford, WI (US); Grant Taylor, Harvard, MA (US)

(73) Assignee: E-IMAGE DATA CORPORATION, Hartford, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,180

(22) Filed: Nov. 14, 2018

(65) Prior Publication Data

US 2019/0080191 A1    Mar. 14, 2019

Related U.S. Application Data

(63) Continuation of application No. 15/142,846, filed on Apr. 29, 2016, now Pat. No. 10,133,946.

(60) Provisional application No. 62/243,944, filed on Oct. 20, 2015, provisional application No. 62/155,280, filed on Apr. 30, 2015.

(51) Int. Cl.
| | |
|---|---|
| *G06K 9/18* | (2006.01) |
| *H04N 1/00* | (2006.01) |
| *G03B 21/11* | (2006.01) |
| *G06K 17/00* | (2006.01) |
| *G03B 21/64* | (2006.01) |

(52) U.S. Cl.
CPC .............. *G06K 9/183* (2013.01); *G03B 21/11* (2013.01); *G06K 17/0016* (2013.01); *H04N 1/00267* (2013.01); *G03B 21/64* (2013.01); *G03B 2206/00* (2013.01); *H04N 2201/0081* (2013.01); *H04N 2201/041* (2013.01)

(58) Field of Classification Search
CPC .... G06K 9/183; G06K 17/0016; G03B 21/11; G03B 2206/00; G03B 21/64; H04N 1/00267; H04N 2201/041; H04N 2201/0081

See application file for complete search history.

(56) References Cited

U.S. PATENT DOCUMENTS

| | | |
|---|---|---|
| 3,619,052 A | 11/1971 | Diachuk et al. |
| 3,646,258 A | 2/1972 | Lemelson |
| 3,741,645 A | 6/1973 | Hollwedel, Jr. et al. |
| 3,809,460 A | 5/1974 | Lettan et al. |
| 3,870,814 A | 3/1975 | Woods et al. |

(Continued)

FOREIGN PATENT DOCUMENTS

| | | |
|---|---|---|
| EP | 0785666 A2 | 7/1997 |
| JP | S6081966 A | 10/1985 |

OTHER PUBLICATIONS

E-Image Data, ScanPro 1000, All-In-One Microfilm Viewer, Scanner-to-PC, Printer, The Complete Digital Solution, Brochure, May 9, 2006, 2 pages.

(Continued)

*Primary Examiner* — Tracy Y. Li
(74) *Attorney, Agent, or Firm* — Quarles & Brady LLP

(57) ABSTRACT

Systems and methods use a digital microform imaging apparatus for sensing an image mark on the microform containing the image of a document.

20 Claims, 24 Drawing Sheets

(56) References Cited

U.S. PATENT DOCUMENTS

| | | | |
|---|---|---|---|
| 4,015,903 A | 4/1977 | Zimmet et al. | |
| 4,343,546 A | 8/1982 | Urquhart | |
| 4,665,318 A | 5/1987 | Toda et al. | |
| 4,687,321 A | 8/1987 | Itoh | |
| 4,803,505 A | 2/1989 | Saijo et al. | |
| 4,931,828 A | 6/1990 | Fujita et al. | |
| 4,947,383 A | 8/1990 | Hudson | |
| 5,099,321 A | 3/1992 | Igarashi | |
| 5,202,724 A | 4/1993 | Nagata et al. | |
| 5,213,322 A | 5/1993 | Matsuo et al. | |
| 5,278,609 A | 1/1994 | Sakaida | |
| 5,486,882 A | 1/1996 | Yamaguchi et al. | |
| 5,488,601 A | 1/1996 | Sakano et al. | |
| 5,712,658 A | 1/1998 | Arita et al. | |
| 5,758,939 A | 6/1998 | Ochiai et al. | |
| 6,057,941 A | 5/2000 | Furukawa et al. | |
| 6,532,313 B1 * | 3/2003 | Yahara | H04N 1/00267 358/403 |
| 2004/0058516 A1 | 3/2004 | Yamazaki | |
| 2004/0131279 A1 * | 7/2004 | Poor | G06K 7/12 382/287 |
| 2004/0136611 A1 | 7/2004 | Reiners | |
| 2007/0034464 A1 | 2/2007 | Barefoot | |
| 2008/0128033 A1 | 6/2008 | McGonigle et al. | |
| 2008/0284847 A1 | 11/2008 | Kahle | |
| 2008/0288888 A1 | 11/2008 | Kahle et al. | |
| 2010/0044441 A1 | 2/2010 | Cohen et al. | |
| 2011/0200256 A1 | 8/2011 | Saubat et al. | |
| 2011/0306263 A1 | 12/2011 | Nakazono et al. | |
| 2014/0380225 A1 * | 12/2014 | Fujiwara | G06F 3/04855 715/776 |
| 2015/0358571 A1 | 12/2015 | Dominguez Castro et al. | |
| 2016/0321514 A1 | 11/2016 | Kahle | |

OTHER PUBLICATIONS

PCT International Search Report and Written Opinion, PCT/US2016/030175, dated Jul. 22, 2016, 10 pages.

* cited by examiner

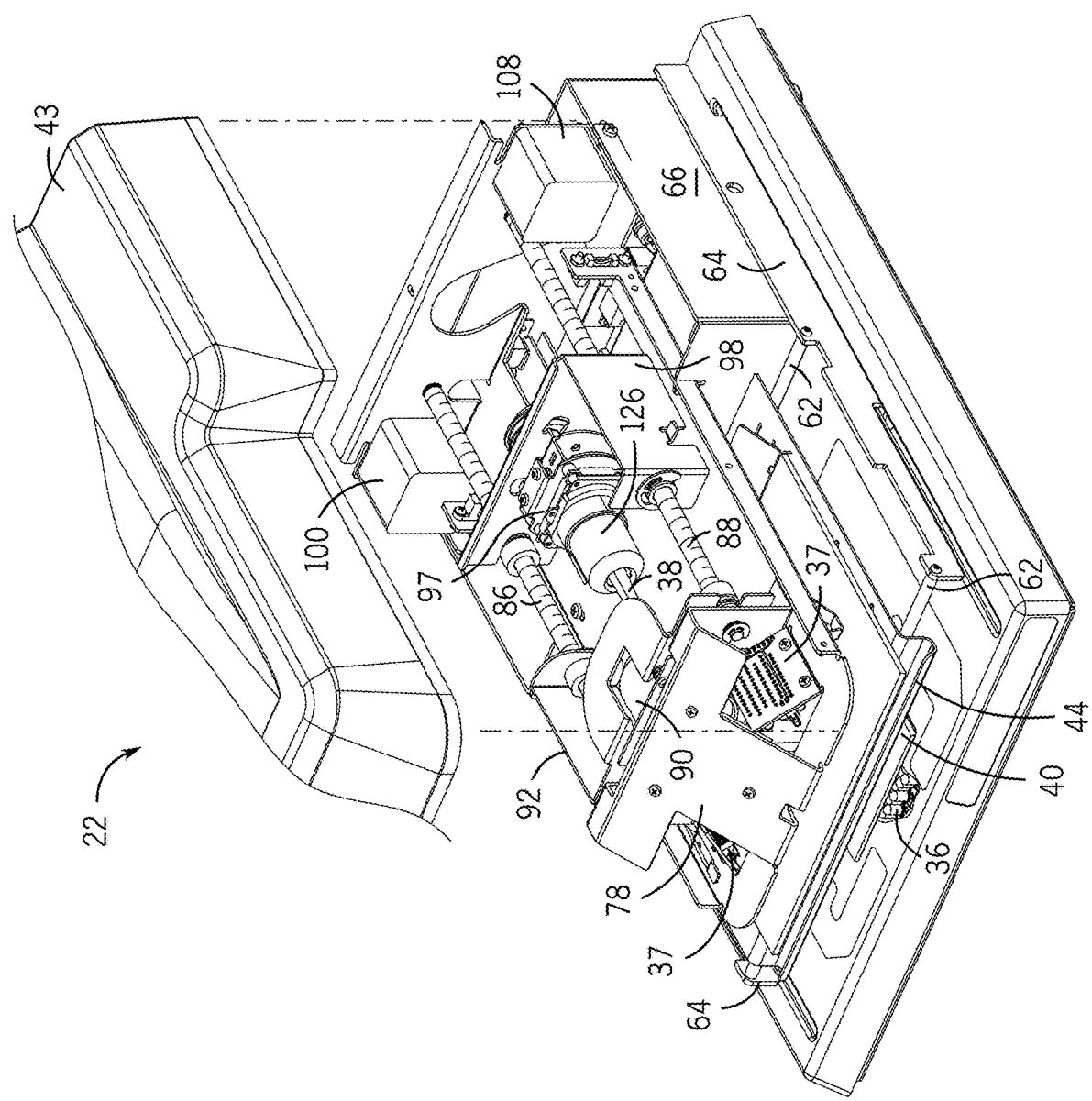

IMAGE MARK SENSING SYSTEMS AND METHODS

CROSS-REFERENCE TO RELATED APPLICATIONS

This application is a continuation application of U.S. patent application Ser. No. 15/142,846 filed on Apr. 29, 2016, and entitled "Image Mark Sensing Systems and Methods," which claims priority to and the benefit of U.S. Provisional Patent Application Ser. No. 62/155,280, filed Apr. 30, 2015, and entitled "Image Mark Sensing Systems and Methods," and which also claims priority to and the benefit of U.S. Provisional Patent Application Ser. No. 62/243,944, filed Oct. 20, 2015, and entitled "Image Mark Sensing Systems and Methods," all of which are hereby incorporated by reference.

FIELD OF THE INVENTION

The present invention relates generally to using a digital microform imaging apparatus for viewing a microform containing an image of a document, and more particularly to using the microform imaging apparatus for sensing an image mark on the microform containing the image of the document.

BACKGROUND OF THE INVENTION

Microform images are useful in archiving a variety of documents or records by photographically reducing and recording the document in a film format. Examples of typical microform image formats include microfilm/microfiche, aperture cards, jacketed microfiche, 16 mm or 35 mm film roll film, cartridge film, both positive and negative, and other micro opaques. For example, a microfiche article is a known form of graphic data presentation wherein a number of pages or images are photographically reproduced on a single "card" of microfiche film (such as a card of 3×5 inches to 4×6 inches, for example), or a roll of film. A large number of pages (up to a thousand or so) may be photographically formed in an orthogonal array on a single microfiche card of photographic film. The microfiche film may then be placed in an optical reader and moved over an optical projection path of a film reader until a selected page is in the optical projection path. The reader generates an image of the selected page, which is then presented on an imager screen for viewing. Although other electronic, magnetic or optical imaging and storage techniques and media are available, there exists an extensive legacy of film type records storing the likes of newspapers and other print media, business records, government records, health records, genealogical records, and the like.

Most rolls of microfilm can contain thousands of document images. These documents are generally ordered numerically or chronologically, although any arrangement is possible. Most often when roll film is used, a user may desire to locate or view only one, or just a few, of the documents on the roll. Finding the desired document(s) can represent a significant challenge of using microfilm. Once the roll of film is loaded onto a microform imaging apparatus, a user could search for the desired document by advancing the film slowly while viewing pertinent information, such as numbers or dates on every document. However, to read this information, the film must be advanced very slowly. Using this method to find the one document among the possible thousands would take a very long time. To speed up the search process, the user can employ a trial and error approach, using fast forward and fast reverse roll film motor controls to more quickly move the film to a general location within the roll of film, and then by using the slow roll film motor controls to ultimately find the desired document. Even the most experienced user wastes a great deal of time finding a desired document in this way.

To speed up this search process, over the years and still today, some rolls of microfilm contain, not only the possible thousands of document images, but also an Image Mark (IM) by each image (see FIGS. 23-27 for examples of IMs). Furthermore, a separate index can be created for each of these rolls identifying the precise location of each document based on the IMs. If a microform imaging apparatus is designed to read these IMs, a user, armed with this index, can direct the microform imaging apparatus to automatically move the roll of film to the desired image, typically in just a few seconds.

There are several standards used for these IMs, with the "IM Standard ISO 11926" and "IMS Standard Cannon & Kodak" describing the most commonly used IM standards (see FIG. 27 for examples). These IMs are a form of bar code, however, this is not a bar code of the type that is typically seen today (many bars of various widths identifying each item in great detail) but rather a single bar for each document image. The standards define that this single bar could be any one of three widths. Each width indicates something about the document. For example, the widest is typically the start of a batch, the middle width typically indicates the start of a file, whereas the narrowest width indicates a page within a batch or file. Rolls of IM'ed film may contain only one width of IMs, other rolls may contain two widths of IMs, and some may contain IMs of all three widths.

Known microform imaging apparatus have used two basic methods to read these IMs. One method is to put dedicated optical sensors in the film path, whereby the IMs are read directly off the film using only the designated sensor. The other method is to put dedicated optical sensors at the viewing screen to read the IMs projected onto that screen. Here still, the dedicated sensor only reads the IM that is projected on the screen. If the film is not held in the correct position in the film path, these sensors can miss the IM altogether, thereby providing inaccurate results.

What is needed in the art is improved systems and methods that can sense an IM on the microform containing the image of a document.

SUMMARY OF THE INVENTION

The present invention provides systems and methods for sensing an image mark on the microform containing the image of a document.

In some embodiments, a system and method for sensing an image mark on a microform using a digital microform imaging apparatus is provided, the apparatus having an area sensor, the system and method comprise sensing at least one image mark on the microform using the area sensor; and sensing an image on the microform using the area sensor.

In some embodiments, a method can include defining an image mark region of interest within the area sensor; and sensing the least one image mark on the microform using the image mark region of interest.

In some embodiments, the area sensor includes a pixel array having a predefined number of pixels, the image mark region of interest having a predefined number of pixels less than the predefined number of pixels of the pixel array.

In some embodiments, the image mark is a single mark for a single image on the microform.

In some embodiments, the image mark is a single mark for two images on the microform.

In some embodiments, sensing the at least one image mark further includes measuring a width of the at least one image mark.

In some embodiments, the at least one image mark has one of only three predefined widths.

In some embodiments, a method can include determining if the at least one image mark is at least one of a batch image mark or a file image mark or a page image mark or an image management code.

In some embodiments, a method can include placing the area sensor into a decimation mode to read less than a maximum number of pixels available on the area sensor.

In some embodiments, a method can include positioning the image mark region of interest on the area sensor to sense the at least one image mark.

In some embodiments, a method can include increasing the gain of the area sensor.

In some embodiments, a method can include, after sensing the image on the microform, displaying the image on a screen of the digital microform imaging apparatus.

In some embodiments, the microform is roll film or cartridge film.

In some embodiments, wherein the microform is duplex mode microfilm, the duplex mode microfilm including a left image and a right image associated with each image mark, and further including selecting one of the left image and the right image for saving as an electronic file.

In some embodiments, a film guide assembly for retaining a microform media on a digital microform imaging apparatus can include a frame; an outside roller assembly supported by the frame; a middle roller assembly supported by the frame; and an inside roller assembly supported by the frame; the outside, middle, and inside roller assemblies forming a film transport path.

In some embodiments, at least two of the outside, middle, and inside roller assemblies form a film slot to load the microform media into the film guide assembly.

In some embodiments, the frame includes a mounting flange to mount the film guide assembly to the digital microform imaging apparatus.

In some embodiments, at least one of the outside, middle, and inside roller assemblies include a user repositionable guiding flange.

In some embodiments, at least one of the outside, middle, and inside roller assemblies include a bearing retention sleeve.

In some embodiments, at least one bearing positioned in the bearing retention sleeve.

In some embodiments, at least one of the outside, middle, and inside roller assemblies include an axle, the axle including threads to thread the axle to the frame.

In some embodiments, the axle further includes a retention member to maintain a position of the axle within the frame.

In some embodiments, a media support lock assembly for retaining a microform media support on a digital microform imaging apparatus includes a body; an adjuster threadably positioned within the body; and a magnet coupled to one end of the adjuster.

In some embodiments, the body includes a yoke for coupling to a rod of the microform media support.

In some embodiments, a media support lock assembly for retaining a microform media support on a digital microform imaging apparatus includes a body to couple to a shaft of the microform media support; and an adjustable magnet coupled to the body.

In some embodiments, a digital microform imaging apparatus includes an area sensor; a film guide assembly for retaining the microform on a film path, the film path including an optical path; a microform support for retaining the microform on the film path; and a media support lock assembly for retaining the microform media support in a predefined position on the digital microform imaging apparatus.

In some embodiments, the film guide assembly further includes a frame; an outside roller assembly supported by the frame; a middle roller assembly supported by the frame; and an inside roller assembly supported by the frame; the outside, middle, and inside roller assemblies forming a film transport path.

In some embodiments, the media support lock assembly further includes a body; an adjuster threadably positioned within the body; and a magnet coupled to one end of the adjuster.

In some embodiments, the area sensor includes an image mark region of interest, the area sensor to sense at least one image mark on the microform using the image mark region of interest, and to sense an image on the microform.

These and other benefits may become clearer upon making a thorough review and study of the following detailed description. Further, while the embodiments discussed above can be listed as individual embodiments, it is to be understood that the above embodiments, including all elements contained therein, can be combined in whole or in part.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2A is an fragmentary, exploded perspective view of the digital microform imaging apparatus used with the system of FIG. 1;

FIGS. 22-27 show various arrangements if IMs on roll film; and

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE EMBODIMENTS

Figure 1:
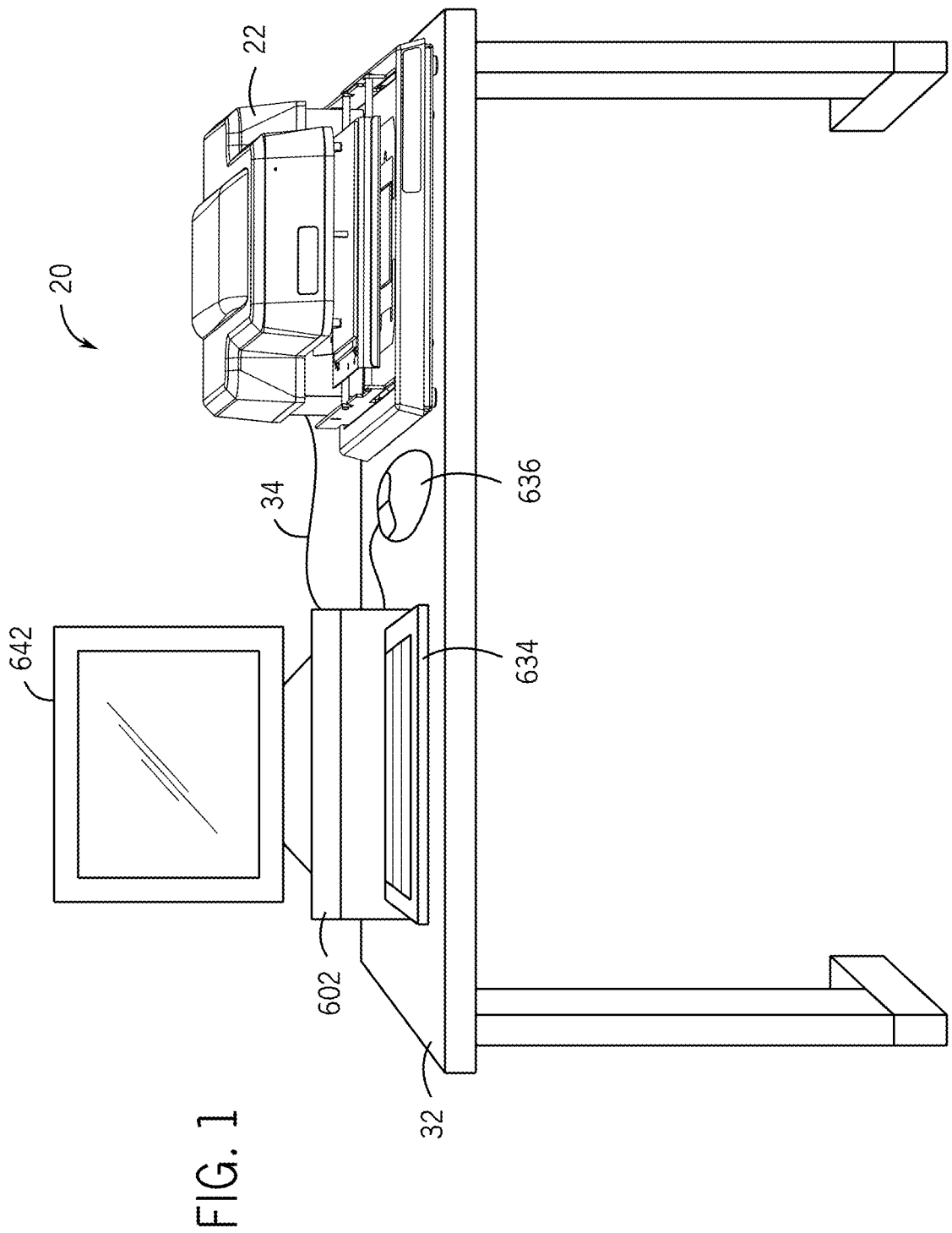
FIG. 1 is a perspective view of an embodiment of a digital microform imaging system according to the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Referring now to the drawings, and more particularly to FIG. 1, there is shown a digital microform imaging system 20 which generally includes digital microform imaging apparatus (DMIA) 22 connected to a computer 602. Computer 602 can include one or more displays 642, and user input devices such as a keyboard 634 and mouse 636. DMIA 22 and computer 602 can be placed on a work surface 32 of a desk, or other work surfaces, for convenient access and ease of use. DMIA 22 can be electrically connected to computer 602 via cable 34, which may provide communication using a FireWire IEEE 1394 standard, for example. Although cable 34 is described as an electrical type cable, alternatively DMIA 22 and computer 602 can communicate via fiber optics, or wirelessly through infrared or radio frequencies, for example. Other details of computer 602 and the general computing environment are discussed in more detail below and shown in FIG. 9. DMIA 22 is described in U.S. Pat. No. 8,269,890, titled "DIGITAL MICROFORM IMAGING APPARATUS", filed May 15, 2007, which application is incorporated by reference as if fully set forth herein.

Referring more particularly to FIGS. 2A-4, DMIA 22 includes an approximately monochromatic illumination source 36, such as a light emitting diode (LED) array or other monochromatic illumination source, transmitting an incident light 38 through a diffuse window 40 along a first optical axis 42 of apparatus 22. Light emitting diode (LED) array 36 can be an approximately 13×9 array of individual LEDs operating in the 495-505 nm wavelength region, although array 36 is not limited to such parameters. The relatively monochromatic nature of source 36 helps reduce chromatic aberration in DMIA 22, thereby improving the optical resolution of the images produced. Diffuse window 40 can be a frosted glass which diffuses the light emanating from array 36, thereby creating a more uniform illumination source. DMIA 22 can include cover 43 to help protect the inner elements of DMIA 22.

Figure 2B:
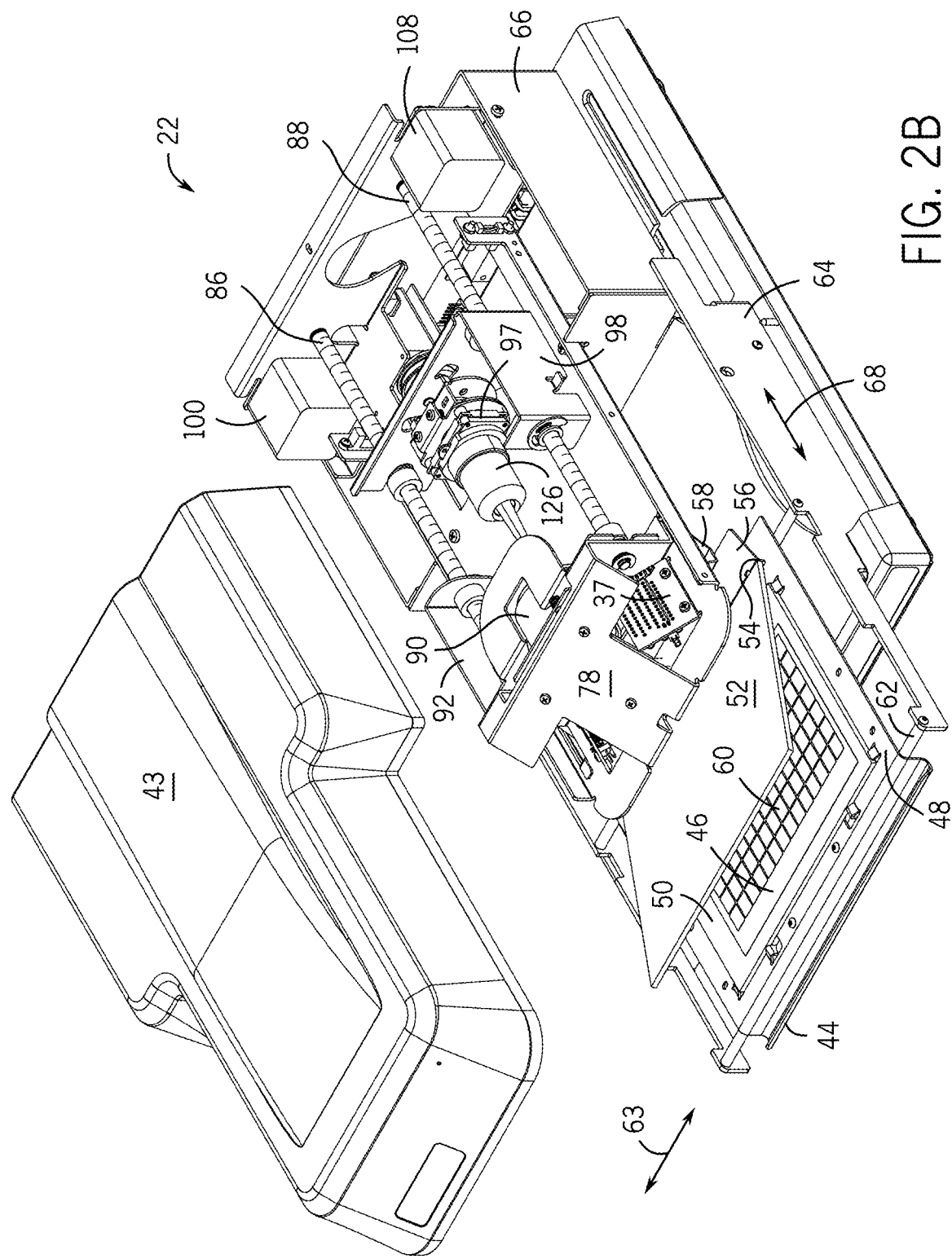
FIG. 2B is an exploded, fragmentary, perspective view of the digital microform imaging apparatus of FIG. 2A, illustrating particularly the X-Y table mobility.

A microform media support 44 is configured to support a microform media 46 after diffuse window 40 and along first optical axis 42. In the embodiment shown support 44 is an X-Y table, that is, support 44 is movable in a plane which is approximately orthogonal to first optical axis 42. Referring particularly to FIGS. 2A and 2B, microform media support 44 includes frame 48 which supports first window 50 on one side of microform media 46, and second window 52 on the other side of microform media 46. Second window 52 hinges upward at 54 when frame 48 is moved forward to the extent that lever 56 (connected to second window 52) contacts ramps 58 (one ramp on either side), and similarly, hinges downward at 54 when frame 48 is moved rearward as lever 56 is released from contact with ramp 58. In this way the microform media 46, shown as a microfiche film with an array of images or microform segments 60, can be placed and held securely between windows 50, 52 for viewing. Frame 48, along with windows 50, 52 and media 46, are slidingly supported on rods 62 by bearings (not shown) to allow a transverse movement 63 of frame 48, windows 50, 52 and media 46. Rods 62 are connected to brackets 64, which brackets are slidingly supported by chassis 66 and bearings (not shown) to allow a longitudinal movement 68 of frame 48, windows 50, 52, media 46 and rods 62.

Figure 3:
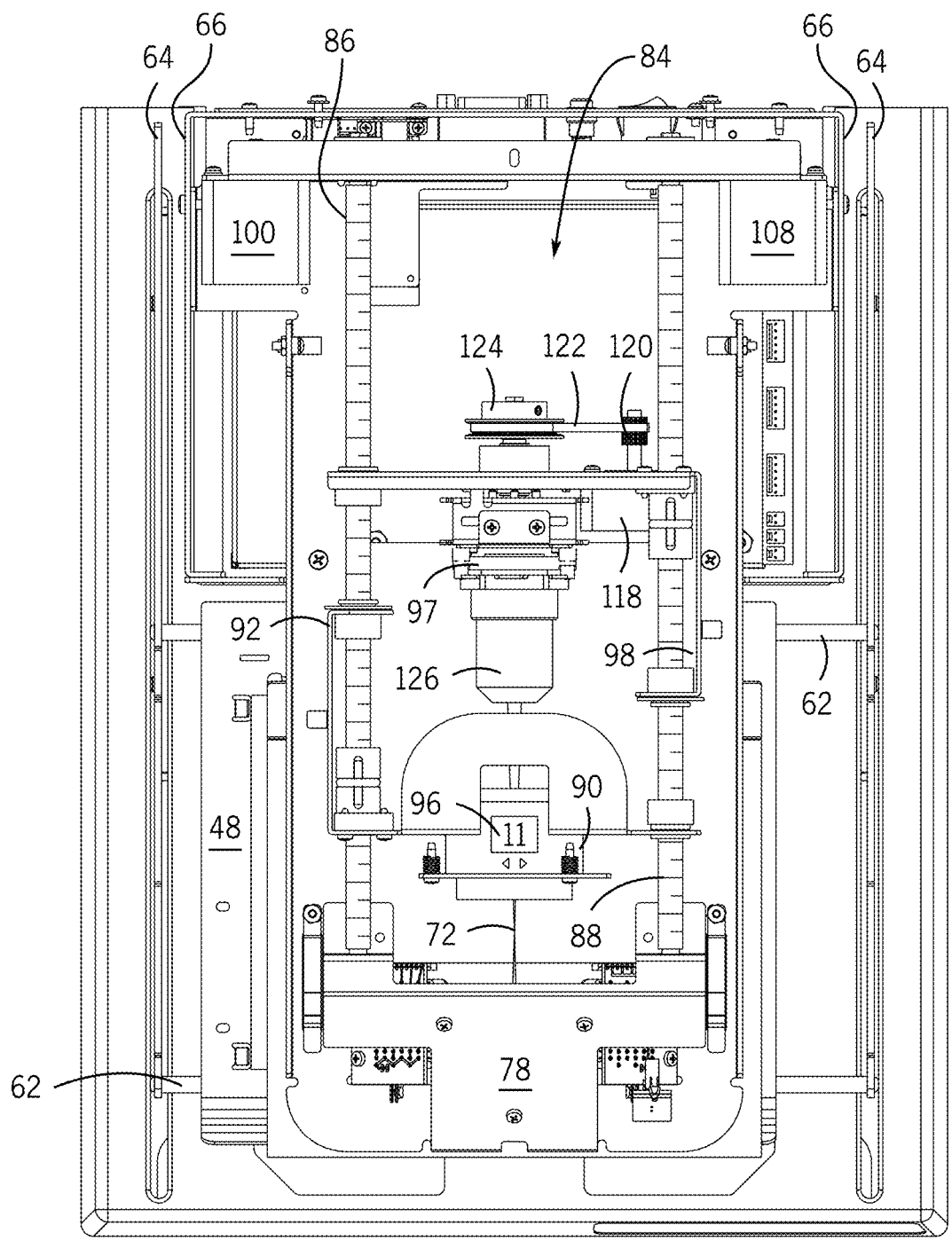
FIG. 3 is a top view of the digital microform imaging apparatus of FIG. 2A.
Figure 4:
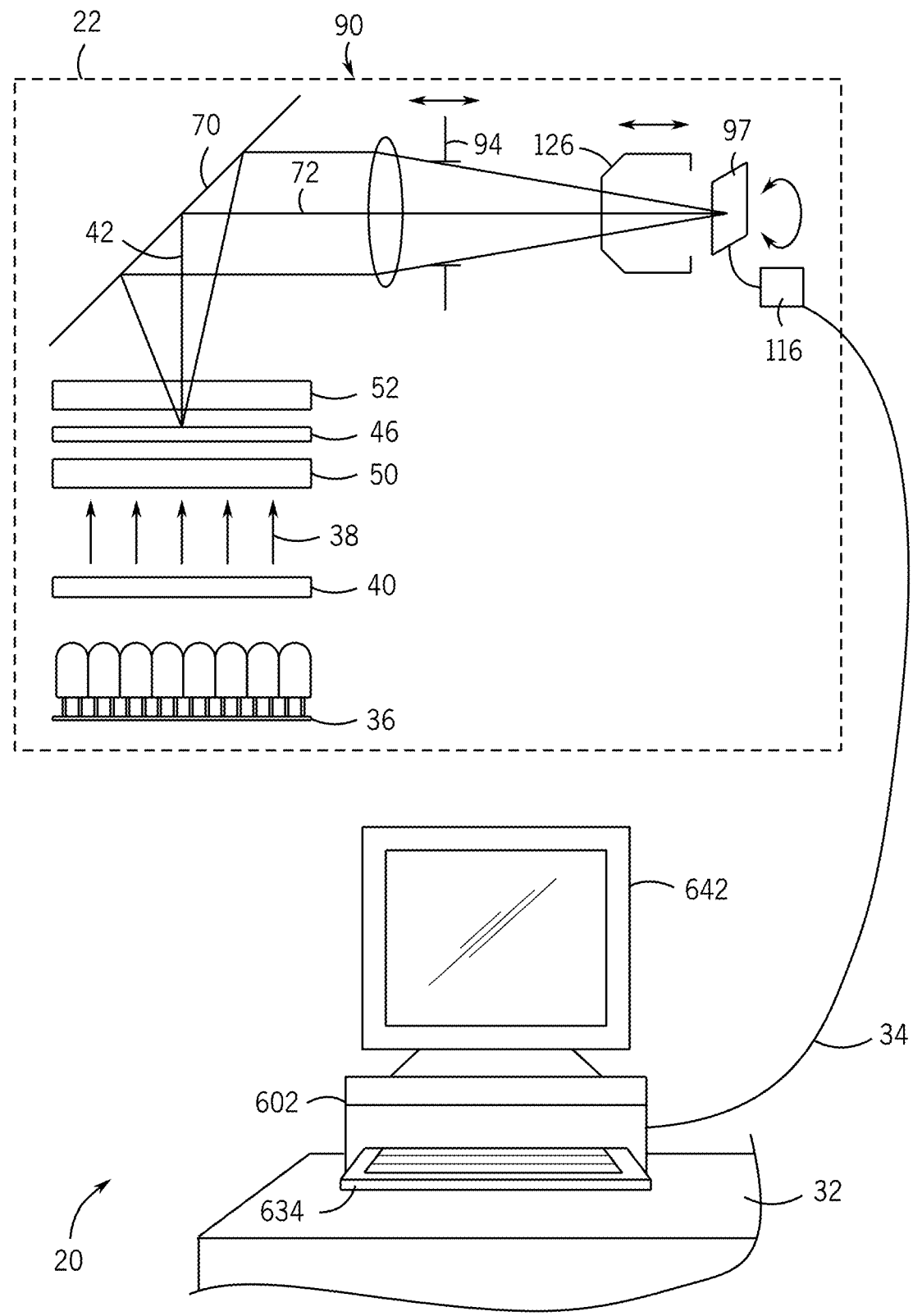
FIG. 4 is a schematic view of the digital microform imaging system of FIG. 1.

Referring to FIGS. 3 and 4, an approximately 45 degree fold mirror 70 reflects the incident light transmitted through microform media 46 approximately 90 degree along a second optical axis 72. First optical axis 42 and second optical axis 72 can be thought of as segments of the single or main optical axis. Mirror 70 is connected by a three point mount to mirror mount 78 by fasteners and springs. Mirror mount 78 is connected to chassis 66 as shown. Fold mirror 70 advantageously shortens the overall longitudinal length of the optical axis which allows DMIA 22 to be more compact.

An imaging subsystem 84 includes a first lead screw 86 and a second lead screw 88 where each lead screw is approximately parallel with second optical axis 72. A lens 90 is connected to a first carriage 92 which is linearly adjustable by rotating first lead screw 86. Lens 90 includes stop 94 and f-stop adjustment 96 which can adjust the aperture of stop 94. Lens 90 can have a fixed focal length of 50 mm, for example. This focal length has the advantage of a relatively large depth of focus. A rough formula used to quickly calculate depth of focus is the product of the focal length times the f-stop divided by 1000, which yields a depth of focus of 0.55 mm for a 50 mm focal length and f11 f-stop adjustment. An optical sensor, i.e., area sensor 97 is connected to a second carriage 98 which carriage is linearly adjustable by rotating second lead screw 88. Area sensor 97 can be an area array CCD sensor with a two dimensional array of sensor elements or pixels, for example, with a 3.5 $\mu m^2$ pixel size, or other types of sensors and pixel sizes depending on resolution size requirements. The area array nature of sensor 97, when compared to a line sensor, eliminates the need for scanning of the sensor when viewing two dimensional images. The overall novel optical layout of the present invention including the separately adjustable area sensor 97 and lens 90; 45 degree fold mirror 70; and film table 44 location; algorithms for moving the lens and sensor to appropriate respective locations to achieve proper magnification and focus of the image; and the lens focal length and relatively large depth of focus, allows DMIA 22 to autofocus without the need for iterative measurements and refocusing of the lens 90 during magnification changes to accommodate different reduction ratios of different film media. Further, the embodiments can easily accommodate reduction ratios in the range of 7x to 54x, although the present invention is not limited to such a range.

A first motor 100 is rotationally coupled to first lead screw 86 by a timing pulley 120, a belt 122 with teeth, and another timing pulley 124 and a second motor 108 is rotationally coupled to second lead screw 88 by a timing pulley, a belt with teeth, and another timing pulley, similar to timing pulley 120, belt 122 with teeth, and timing pulley 124, respectively. A controller 116 is electrically connected to first motor 100, second motor 108 and area sensor 97, where controller 116 is for receiving commands and other inputs from computer 24 or other input devices, controlling first motor 100 and second motor 108, and other elements of DMIA 22, and for outputting an image data of area sensor 97. Consequently, controller 116 can include one or more circuit boards which have a microprocessor, field programmable gate array, application specific integrated circuit or other programmable devices; motor controls; a receiver; a transmitter; connectors; wire interconnections including ribbon wire and wiring harnesses; a power supply; and other electrical components. Controller 116 also provides electrical energy and lighting controls for LED array 36.

A third motor 118 is rotationally coupled to area sensor 97, where controller 116 additionally controls third motor 118 through electrical connections as with motors 100 and 108. For example, controller 116 can rotate area sensor 97, using motor 118, timing pulley 120, belt 122 with teeth, and timing pulley 124, to match an aspect ratio of microform media 46, and particularly an aspect ratio of images 60. A light baffle 126 can be connected to area sensor 97 to reduce stray light incident on sensor 97 and thereby further improve the resolution and signal to noise of DMIA 22. Light baffle 126 can have an antireflective coating at the front and inside surfaces of the baffle to further reduce stray light incident on sensor 97. Motors 100, 108 and 118 can be DC servomotors, or other motors.

Figure 5:
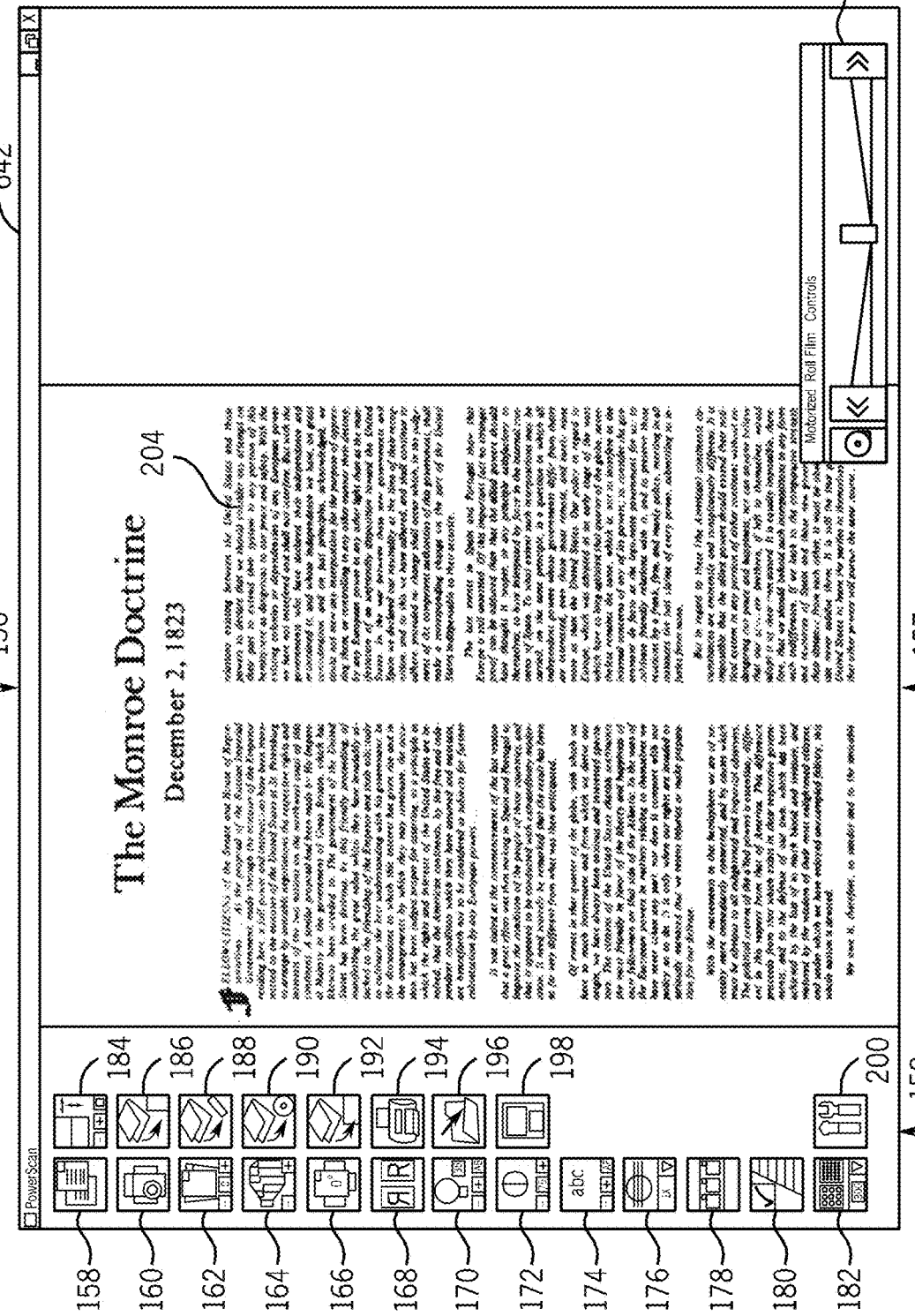
FIG. 5 is a screen shot of an embodiment of a computer user interface of the digital microform imaging system of FIG. 1, including image data.

Referring to FIG. 5, computer 602 includes a software computer user interface (CUI) 156 displayed by monitor 642 with user inputs to control DMIA 22 in general, and particularly, illumination system 36, motors 100, 108 and 118, and other elements of DMIA 22. CUI 156 can be in the form of at least one instruction executed by the at least one processor 604, where the instructions of CUI 156 are stored on computer-readable storage medium such as any number of program modules stored on hard disk 616, magnetic disk 620, optical disk 624, ROM 612, and/or RAM 610, or other computer-readable storage medium. CUI 156 generally includes a display area 157 and a toolbar 159 with user selectable controls as follows. Toolbar 159 or other dialog boxes can include various software user input buttons, including but not limited to: positive/negative film type 158; landscape/portrait film orientation 160; rotate optical 162 for rotating third motor 118; optical zoom 164 which controls first motor 100 and second motor 108; digital image rotation 166; mirror image 168 for adjusting for when media 46 is placed on support 44 upside down; brightness 170 which adjusts the speed of sensor 97; contrast 172; focus 174 with manual focus (−/+) and autofocus (AF), also controlling first motor 100; digital magnifier 176; live button 178; scan type/selecting grayscale, grayscale enhanced, halftone 180; resolution/image capture 182; scan size button for prints/fit to page 184; save image scan to computer drive #1 186; save image scan to computer drive #2 188; save image scan to computer drive #3 190; save image scan to email 192; print image 194; restore settings 196; save settings 198; setup/tools 200; and motorized roll film controls 202 for embodiments with motorized roll film attachments. These controls of toolbar 159 can be selected by a user with a left click of mouse 636. Other toolbar or dialog box input selections are contemplated.

Figure 6:
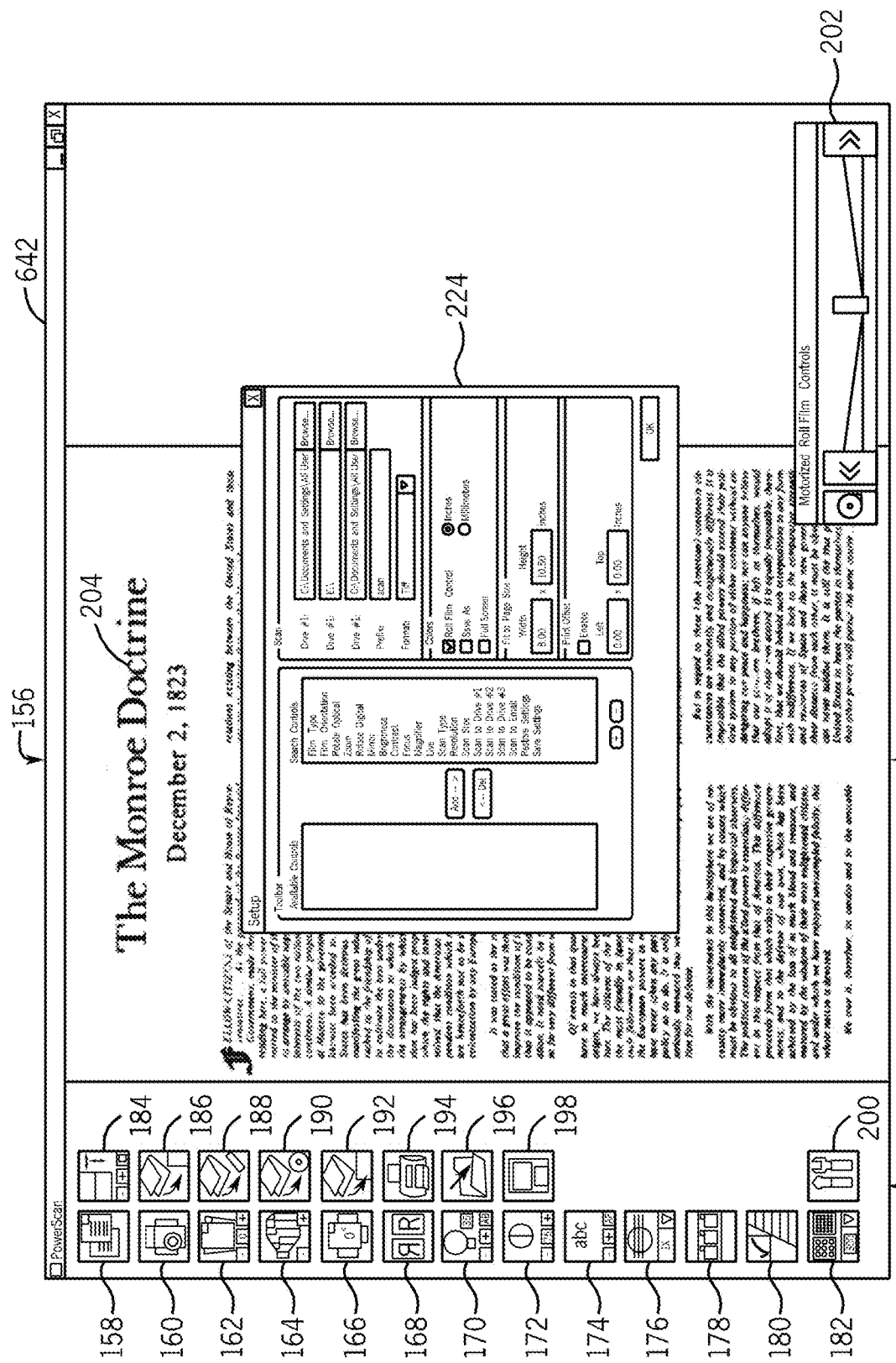
FIG. 6 is a screen shot similar to FIG. 5, but also including a setup dialog box.

FIG. 6 illustrates the configurable nature of CUI 156, and more particularly toolbar 159. Selecting setup/tools 200 opens dialog box 224. Toolbar controls and other parameters are added, deleted and/or changed as shown by dialog box 224.

Figure 7:
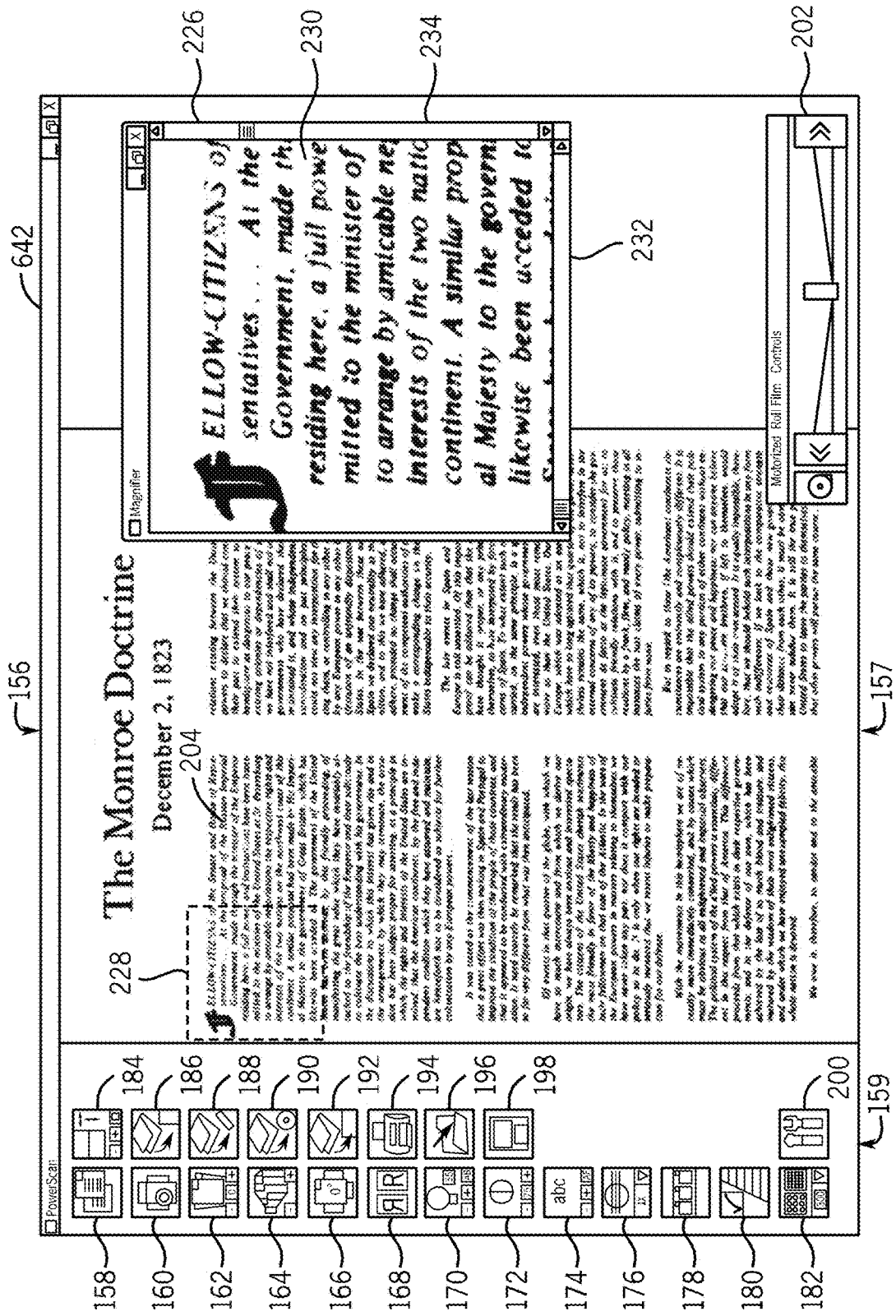
FIG. 7 is a screen shot similar to FIG. 5, but also including a digital magnifier window.

FIG. 7 illustrates a particularly advantageous aspect of CUI 156. By selecting the optical zoom 164, a user can select the magnification of image data 204 derived from microform segment 60. However, it is generally advantageous to select this optical magnification such that image data 204 includes all of the data of a particular microform segment 60, so that a user knows, at least in general, what elements or data are on this segment, and for subsequent printing, storing or emailing of the segment 60. However, depending on the size of monitor 642, the quality of the originally scanned record, the reproduction quality of microform media 46 and segment 60, and the resolution capabilities of DMIA 22, image data 204 may not be readable, or easily readable, by a typical user.

By selecting the magnifier glass portion of digital magnifier 176, CUI 156 creates magnifier window 226. An indicator box 228 identifies which subsegment 230 of image data 204 is being illustrated in magnifier window 226. By clicking on indicator box 228 and dragging it around image data 204 a user can pan around image data 204, with the subsegment data of new locations being shown in magnifier window 226. However, the data within indicator box 228 itself is not magnified, and indicator box 228 itself does not provide the functionality to expand indicator box 228. Instead, selecting the arrow portion of digital magnifier 176 selects the digital magnification of the subsegment 230 of image data 204 within magnifier window 226, and magnifier window 226 can be expanded transversely, longitudinally and diagonally by placing the cursor on one of the sides, or a corner, and mouse clicking and dragging to expand magnifier window 226, as is typical in windows of Windows® operating system. Scroll bars 232, 234 of magnifier window 226 can be used to scroll within window 226. Although indicator box 228 moves and expands with magnifier window 226, the data within indicator box 228 is not digitally magnified, in contrast with the data within magnifier window 226.

A programmer with ordinary skill in the art in Windows® operating system including callable subroutines, or other operating systems and their callable subroutines, and C++ or Visual Basic programming language can create the CUI 156 as shown in FIGS. 5-7 and defined above.

Area sensors that support decimation are also contemplated for use. Area sensors that support decimation can read out every other, every third, fourth, fifth, or sixth pixel, as non-limiting examples. Reading fewer pixels reduces resolution, however it also speeds up refresh rate. Refresh rates while in the landscape mode may be reduced. Further, some area sensors allow for the selection of switching the entire sensor from color to grayscale to black and white. It is also to be appreciated that area sensors that can support multiple modes simultaneously are also contemplated for use in the same or similar ways as described above for both color and monochrome sensors.

Figure 8:
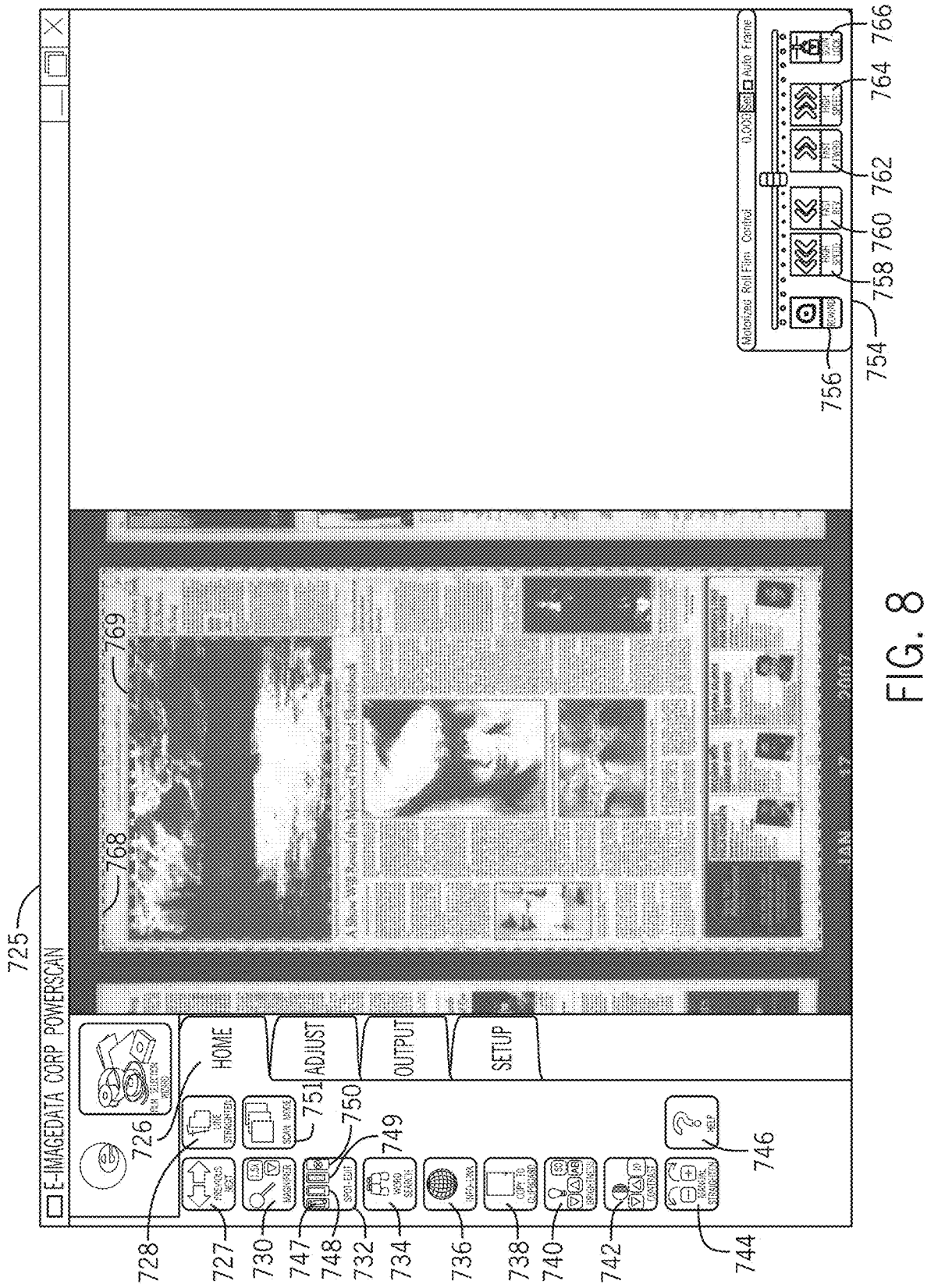
FIG. 8 is an example of an embodiment of a user interface usable with the present invention.

FIG. 8 illustrates an example of another embodiment of a user interface 725 for use with embodiments of the invention. The user interface 725 can contain a home screen 726 having a variety of buttons used to control features of the imaging system 20. As non-limiting examples, control buttons can include previous and next buttons 727, a line straighten button 728, a spot EDIT button 730, a word search button 734, an INFO Link button 736, a copy to clipboard button 738, brightness buttons 740, contrast buttons 742, mode buttons 751, manual straightening buttons 744, and a help button 746. The previous and next buttons 727 allow the user to move between images.

The spot EDIT button 730 can have four sub-buttons: a pencil tool button 747, a white redact tool button 748, a black redact tool button 749, and a cancel zone button 750. The pencil tool button 747 can allow the user to draw the perimeter of a zone 769. Zones can be rectangular or irregular in shape and can be marked with borders. For example, when the user is finished drawing the perimeter of a zone, the perimeter of the zone 769 may become a magenta border to indicate that the zone is active. The active zone, the selected one for setting the mode (color, grayscale, and black and white), brightness, and contrast, may be marked with a bold border. A zone may be made active by moving a mouse cursor somewhere inside the border and left clicking. In some embodiments, when a zone is made active, the brightness 740, contrast 742, and mode 751 buttons can be highlighted to indicate that they are active. The mode and the brightness and contrast of each zone can be adjusted independently. The mode buttons 751 can be used to adjust the mode of the active zone between different types of modes including color, grayscale, and black and white, as non-limiting examples. The zones created by the user also may be automatically defined by processing unit 604, which may be designed to read the composition of the document, as stated above. The white redact tool button 748 allows the user to make the entire active zone white. The black redact tool button 749 allows the user to make the entire active zone black. The redact tools may be used for security purposes on images that have sensitive information. The user also may just want to remove some of the information because of personal preference. The cancel zone button 750 allows the user to cancel the active zone or, if the cancel zone button 750 is double clicked, cancel all zones. The dashed line identifies a crop box 768. The crop box 768 can define the area to be printed, scanned, or emailed, as non-limiting examples. It is to be appreciated that the multi-mode image can be printed directly, without saving to a file, and retains the same beneficial characteristics of smaller file sizes, preserved image detail, and when selected, the preferred black text on a white background appearance. The user interface 725 can also contain an output screen 752 and a setup screen 753.

The word search button 734 allows the user to search for words in the image, and in some embodiments, without the text having been OCR'd. The INFO Link button 736 allows the user to search for selected words in an internet search engine or other information source. The copy to clipboard button 738 allows the user to copy the image to clipboard for later use by the user. The brightness buttons 740 allow the user to change the brightness of the active zone to the desired level. The contrast buttons 742 allow the user to change the contrast of the active zone to the desired level. The help button 746 brings up a screen to assist the user with various anticipated problems the user might have with the program.

The user interface 725 can also contain a motorized roll film control 754 designed for use with microfilm. The motorized film control 754 contains a rewind button 756, a high speed reverse button 758, a fast reverse button 760, a fast forward button 762, a high speed forward button 764, and a lock button 766. The rewind button 756, high speed reverse button 758, fast reverse button 760, fast forward button 762, and a high speed forward button 764 allow the user to go back and forth on a roll of film at whatever speed is desired by the user. The lock button 766 allows the speed of the film to be held at a consistent slow speed.

Figure 9:
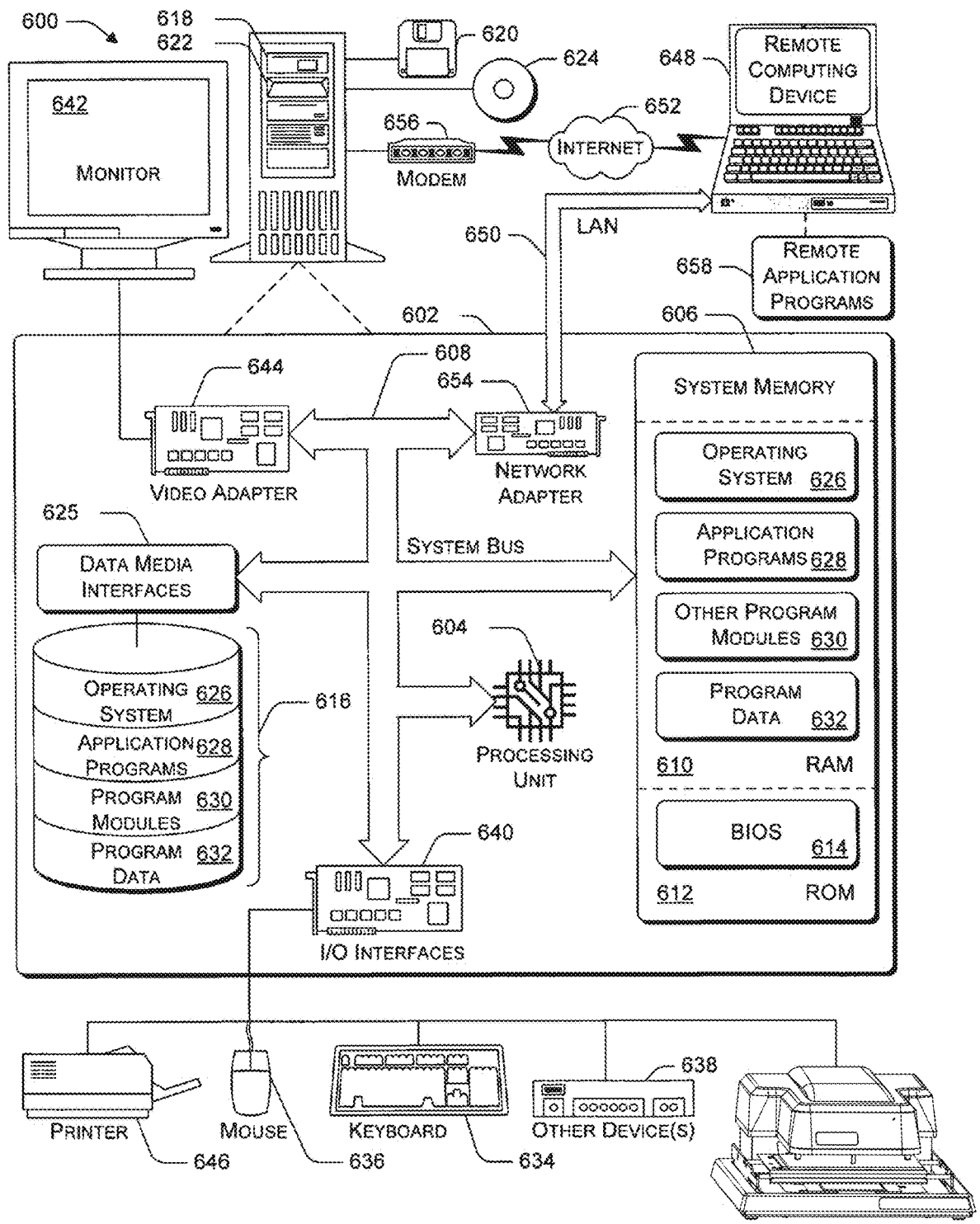
FIG. 9 is a schematic view of a general computing environment including the digital microform imaging system and computer of FIG. 1.

FIG. 9 illustrates a general computer environment 600, which can be used to implement the techniques according to the present invention as described above. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 can include a general-purpose computing device in the form of a computer 602. The components of computer 602 can include, but are not limited to, one or more processors or processing units 604, system memory 606, and system bus 608 that couples various system components including processor 604 to system memory 606.

System bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 602 may include a variety of computer readable media. Such media can be any available media that is accessible by computer 602 and includes both volatile and non-volatile media, removable and non-removable media.

System memory 606 can include computer readable media in the form of volatile memory, such as random access memory (RAM) 610, and/or non-volatile memory, such as read only memory (ROM) 612 or flash RAM. Basic input/output system (BIOS) 614, containing the basic routines that help to transfer information between elements within computer 602, such as during start-up, is stored in ROM 612 or flash RAM. RAM 610 typically contains data and/or program modules that are immediately accessible to and/or presently operated on by processing unit 604.

Computer 602 may also include other removable/non-removable, volatile/non-volatile computer storage media. By way of example, FIG. 9 illustrates hard disk drive 616 for reading from and writing to a non-removable, non-volatile magnetic media (not shown), magnetic disk drive 618 for reading from and writing to removable, non-volatile magnetic disk 620 (e.g., a "floppy disk"), and optical disk drive 622 for reading from and/or writing to a removable, non-volatile optical disk 624 such as a CD-ROM, DVD-ROM, or other optical media. Hard disk drive 616, magnetic disk drive 618, and optical disk drive 622 are each connected to system bus 608 by one or more data media interfaces 625. Alternatively, hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, removable magnetic disk 620, and removable optical disk 624, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 616, magnetic disk 620, optical disk 624, ROM 612, and/or RAM 610, including by way of example, operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

One example of an application program 628 is an OCR engine. The OCR engine may be a commercially available program. One such OCR engine is named ABBYY FineReader and is available from ABBYY USA, Inc.

A user can enter commands and information into computer 602 via input devices such as keyboard 634 and a pointing device 636 (e.g., a "mouse"). Other input devices 638 (not shown specifically) may include a microphone, joystick, game pad, satellite dish, serial port, scanner, and/or the like. These and other input devices are connected to processing unit 604 via input/output interfaces 640 that are coupled to system bus 608, but may be connected by other interface and bus structures, such as a parallel port, game port, or a universal serial bus (USB).

Monitor 642 or other type of display device can also be connected to the system bus 608 via an interface, such as video adapter 644. In addition to monitor 642, other output peripheral devices can include components such as speakers (not shown) and printer 646 which can be connected to computer 602 via I/O interfaces 640. In addition, monitor 642 may comprise a touch screen so as to allow the user to provide input to the processing unit 604 by simply touching the screen.

Computer 602 can operate in a networked environment using logical connections to one or more remote computers, such as remote computing device 648. By way of example, remote computing device 648 can be a PC, portable computer, a server, a router, a network computer, a peer device or other common network node, and the like. Remote computing device 648 is illustrated as a portable computer that can include many or all of the elements and features described herein relative to computer 602. Alternatively, computer 602 can operate in a non-networked environment as well.

Logical connections between computer 602 and remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, computer 602 is connected to local network 650 via network interface or adapter 654. When implemented in a WAN networking environment, computer 602 typically includes modem 656 or other means for establishing communications over wide network 652. Modem 656, which can be internal or external to computer 602, can be connected to system bus 608 via I/O interfaces 640 or other appropriate mechanisms. It is to be appreciated that the illustrated network connections are examples and that other means of establishing at least one communication link between computers 602 and 648 can be employed.

In a networked environment, such as that illustrated with computing environment 600, program modules depicted relative to computer 602, or portions thereof, may be stored in a remote memory storage device. By way of example, remote application programs 658 reside on a memory device of remote computer 648. For purposes of illustration, applications or programs and other executable program components such as the operating system are illustrated herein as discrete blocks, although it is recognized that such programs and components reside at various times in different storage components of computing device 602, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

The present invention is not limited by the DMIA 22 shown as there are other DMIAs, or microfilm or micro opaque readers, scanners, etc., which are available which can be used in conjunction with a computer and the CUI of the present invention. Further, the present invention is not limited by a separate DMIA 22 and computer 602. For example, computer 602 can be integrated into DMIA 22, or can be part of controller 116. Yet further, monitor 642 can be a part of DMIA 22, or one of these variation, instead of a separate device.

Figure 10:
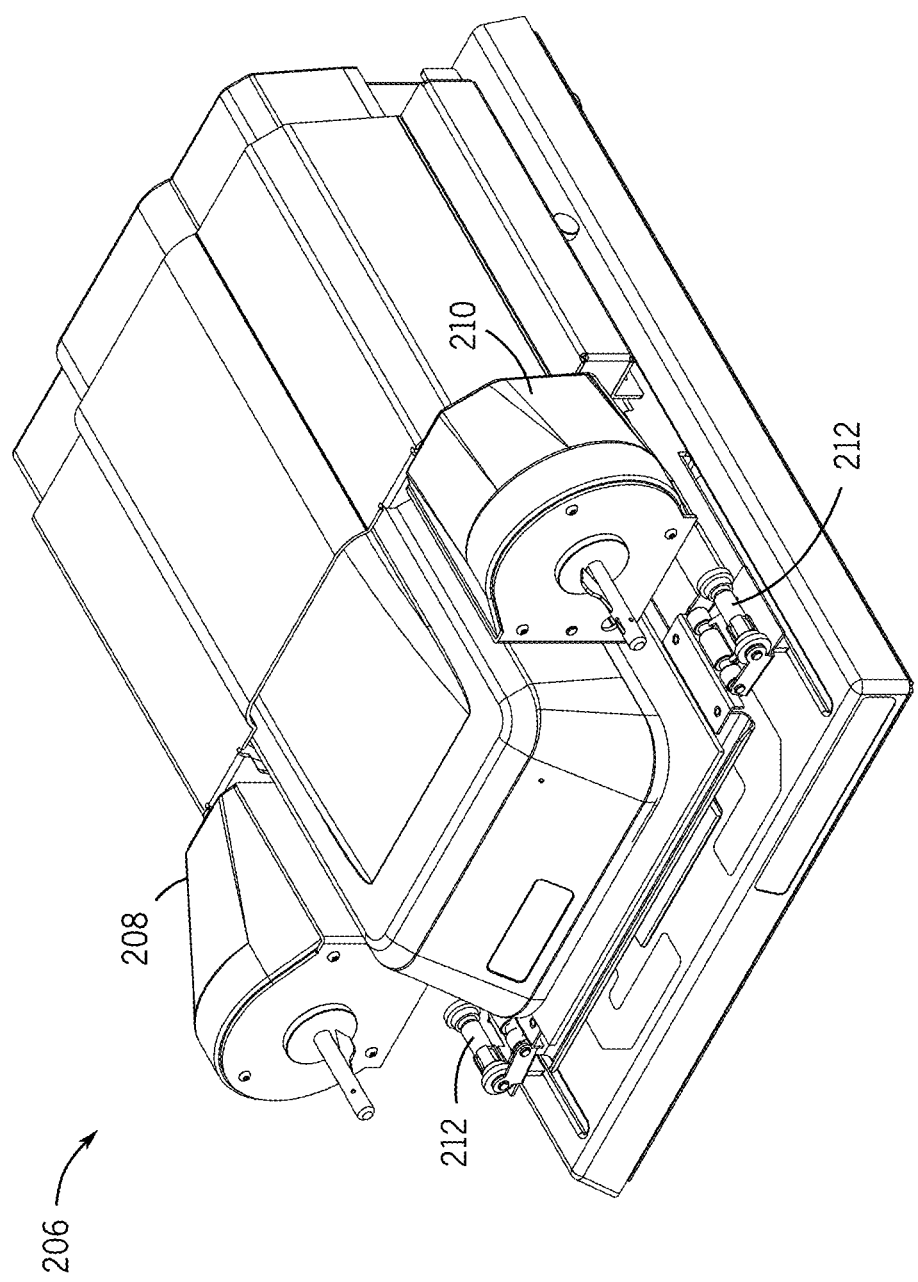
FIG. 10 is a perspective view of another embodiment of a digital microform imaging apparatus according to the present invention, particularly illustrating a motorized roll film microform media support.
Figure 11:
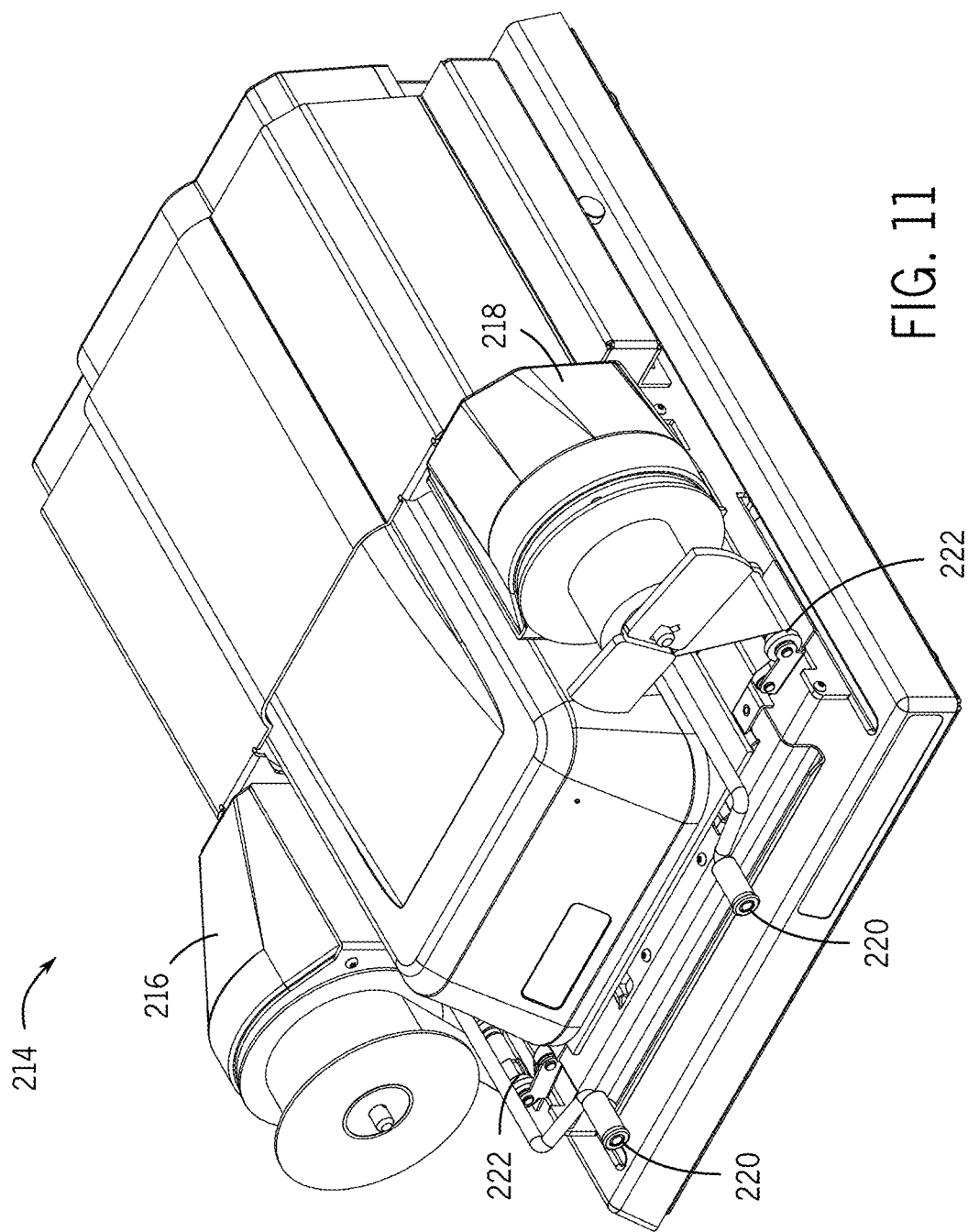
FIG. 11 is a perspective view of another embodiment of a digital microform imaging apparatus according to the present invention, particularly illustrating a hand operated roll film microform media support.

Media 46 can include any microform image formats such as microfilm/microfiche, aperture cards, jackets, 16 mm or 35 mm film roll film, cartridge film and other micro opaques. Micro opaques are different than transparent film. Images are recorded on an opaque medium. To view these micro images one needs to use reflected light. The present invention can use LED arrays 37 (FIG. 2A) for use with micro opaques, which can be the same, or similar to, the monochromatic LED's that are used in illumination source 36. In the embodiment of FIG. 10, DMIA 206 includes a microform media support in the form of motorized roll film attachment with supply side 208 and take up side 210 and film guides 212, in addition to X-Y table 44. In the embodiment of FIG. 11, DMIA 214 includes a microform media support in the form of hand operated roll film attachment with supply side 216 and take up side 218 with cranks 220, and film guides 222, in addition to X-Y table 44. In other ways, DMIAs 206 and 214 are similar to or the same as DMIA 22. Therefore, the microform media support structure according to the present invention is at least one of a X-Y table, a motorized roll film carrier, and a hand operated roll film carrier, and a cartridge film carrier.

In some embodiments, any of the DMIAs 22, 206, 214, 236 (see FIGS. 1, 10, 11, and 12) can be used for sensing an IM on the microform containing the image of a document. Embodiments provide designs that reduce costs and yet provide all the benefits of the existing equipment. To accomplish this, embodiments read and measure the various sized IMs using the capabilities of the area sensor 97 used for document imaging instead of requiring an additional dedicated sensor to read the IMs. As a non-limiting example, the area sensor can be a 6.6 MP (Megapixels) area sensor. At full resolution, the image refresh rate is approximately 6 fps (frames per second). There are generally two factors that can limit the frame rate. If illumination is unlimited, then the primary limit on frame rate is a frame readout time (i.e., the speed of the electronics that clock out the information from the sensor). If the illumination is not unlimited, there can be instances when the exposure time is greater than the frame readout time. When this happens, the frame rate is limited by the exposure time. For some applications, it was calculated to require approximately 1000 fps to read IMs as they move across the area sensor 97 at fast film transport speeds. As a non-limiting example, fast transport speeds can be in the range of three to five feet per second, although transport speeds can be lower than three feet per second, and can be higher than five feet per second. The area sensor 97 can include several features that can be utilized to increase the frame rate. These features include, but are not limited to, "decimation", defining a smaller IM (Region of Interest) ROI usable during the IM sensing process, and gain control. Additionally, even if decimation is set to the highest and the IM ROI is set to the smallest, if there is not enough illumination, speeds of 1000 fps may still not be reached. By increasing the gain, the area sensor 97 can become faster (more sensitive to light) allowing speeds of 1000 fps or more to be achieved without changing a source of illumination. It is to be appreciated that the above is an example only, and that other speeds may apply.

Figure 21:
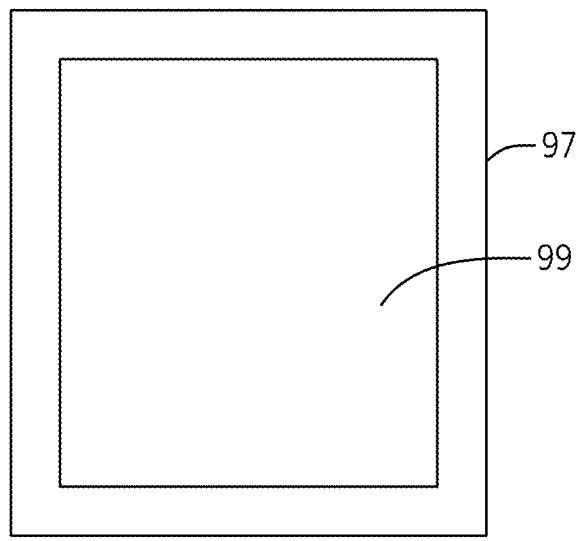
FIG. 21 is a schematic of an area sensor usable with the present invention.
Figure 22:
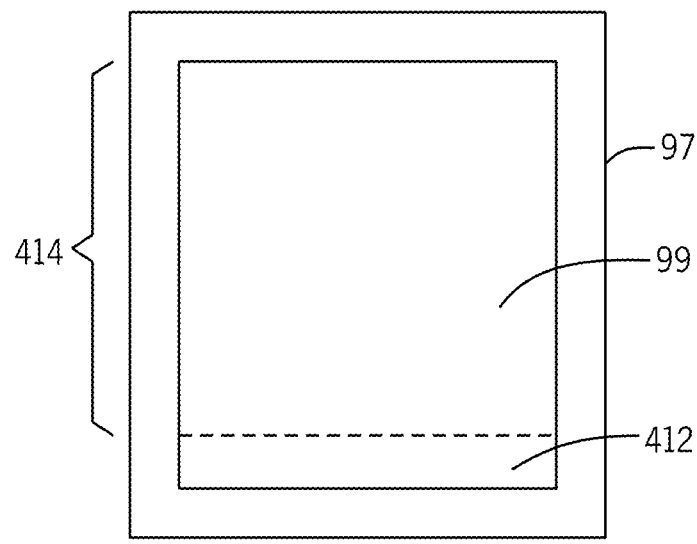
FIG. 22 is a schematic of the area sensor of FIG. 21, and including an IM ROI according to embodiments of the invention.
Figure 23:
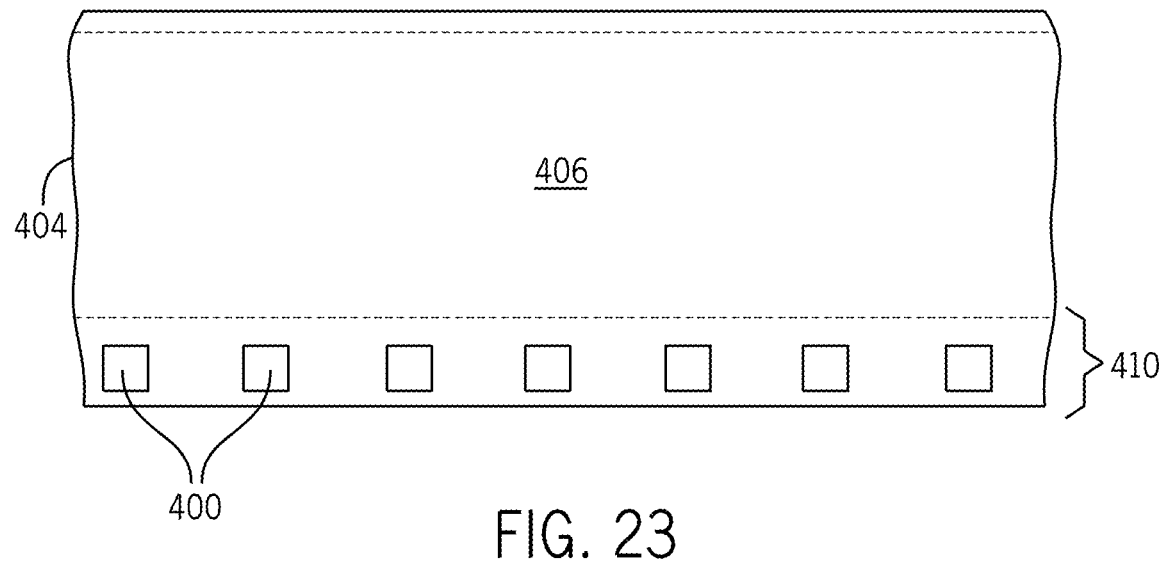

Once the desired document is reached, all or any of a predefined quantity of the pixels in a pixel array 99 of the area sensor 97 (see FIGS. 21 and 22) can then sense the document image and display the document on the screen. FIG. 21 shows the area sensor 97 including the pixel array 99. As seen in FIG. 22, a subsection of the pixel array 99 can be defined as an IM ROI 412 and that can be used during the IM sensing process to increase the frame rate of the area sensor 97, with the remaining portion 414 of the pixel array not being used during the IM sensing process. In some embodiments, more than one IM ROI 412 can be defined within the pixel array 99.

As described above, the DMIAs can be designed to accommodate all forms of microfilm. To accomplish this, the microform media support 44 can be movable along the X and Z axes. This media support movement, necessary for other forms of microfilm, creates a challenge when reading IMs. IMs are generally always located in the same position on the roll of film and therefore when reading these IMs, the media support 44 is desirably located and generally fixed in the same position each time a roll of film is loaded.

For IM sensing to work reliably, it is important that the film be positioned in the optical path where an image of the film can be projected onto the area sensor 97 (see FIG. 4 for example) so that the IM appears in precisely the same location on the image sensor 97 at substantially all times. This includes each time a new roll of film is loaded and throughout the transporting of the film through the optical path.

Figure 12:
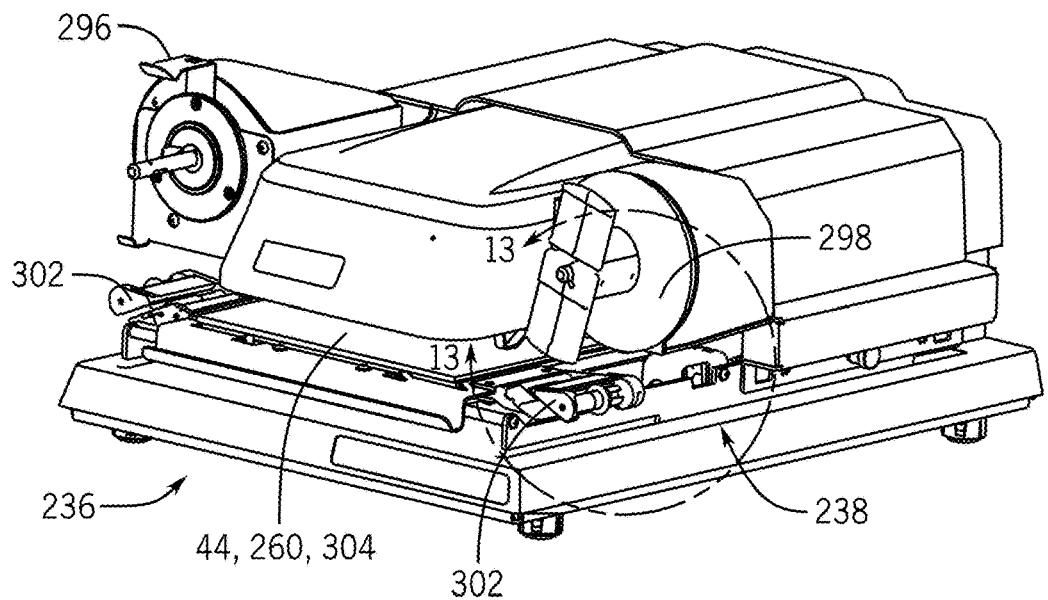
FIG. 12 is a perspective view of another embodiment of a digital microform imaging apparatus according to the present invention, particularly illustrating a film guide assembly.

FIG. 12 is a perspective view of another embodiment of a digital microform imaging apparatus 236 according to the present invention, particularly illustrating a motorized roll film microform media support 238.

Figure 13:
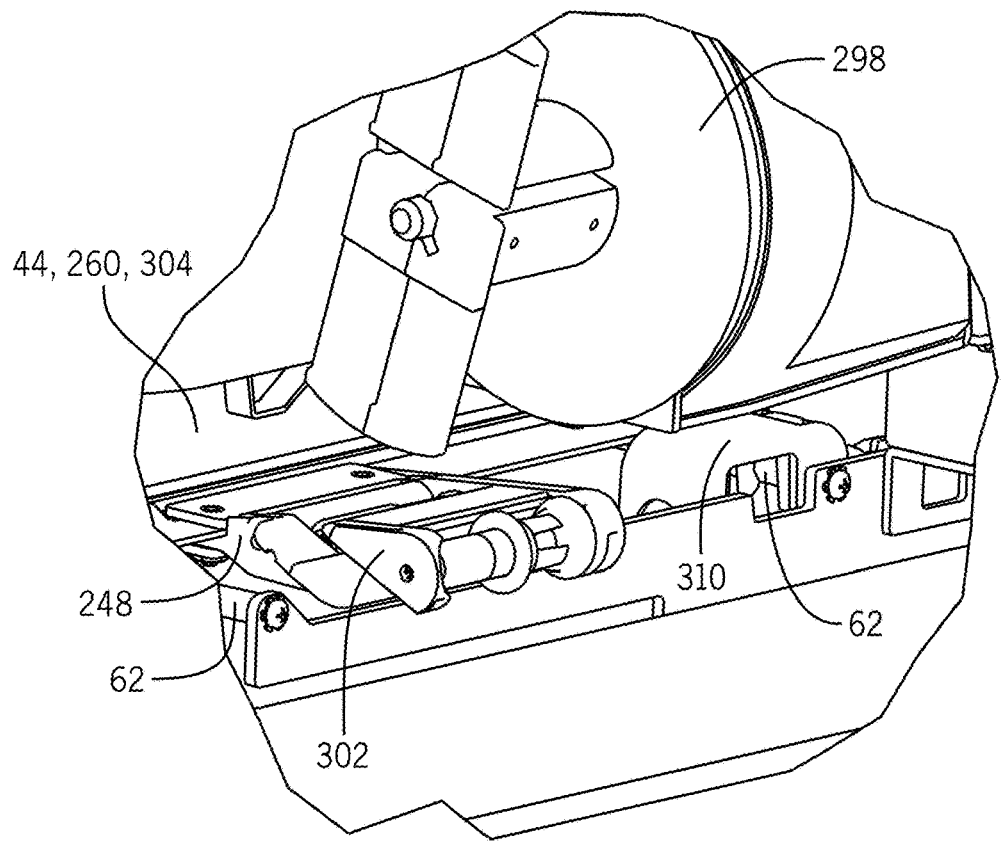
FIG. 13 is a partial close-up of an embodiment of a film guide assembly as shown in FIG. 12.

Referring to FIGS. 12 and 13, an embodiment of a first film guide assembly 302 is shown. The first film guide assembly 302 is shown positioned to the right of the optical film plane 304. A second film guide assembly 302 can be positioned to the left of the optical film plane 304. The second film guide assembly 302 can be a mirror image of the first film guide assembly 302, although not required. Each of the film guide assemblies 302 can have a mounting flange 248 (see also FIG. 14), which can be coupled to any of the DMIAs 22, 206, 214, 236 (see FIGS. 1, 10, 11, and 12).

Figure 14:
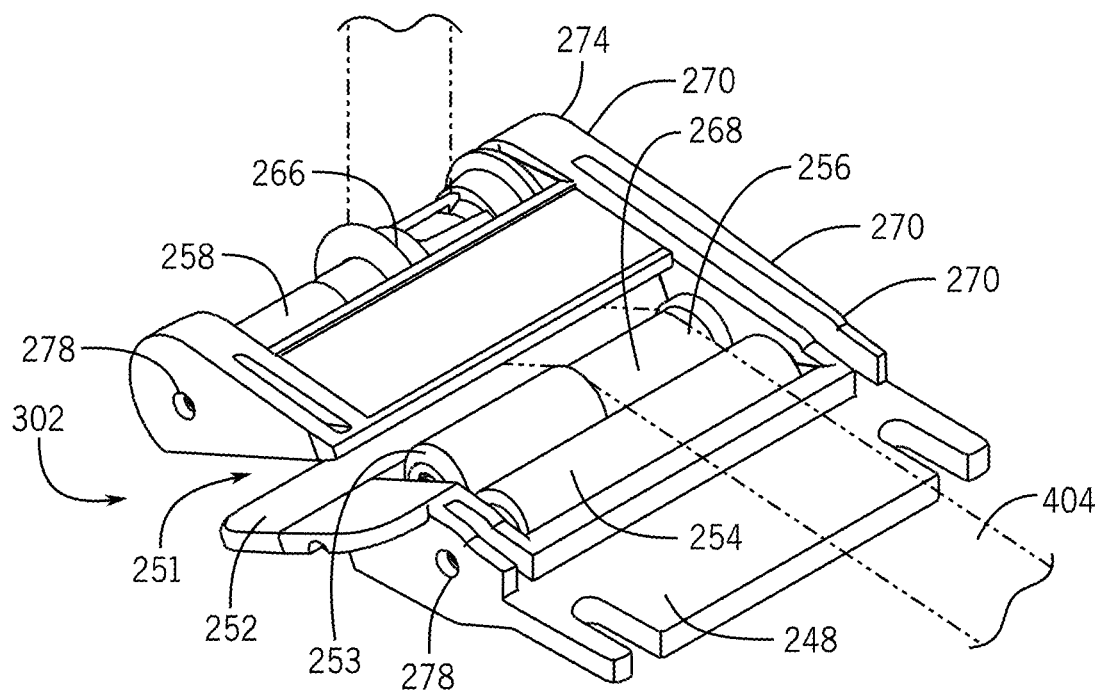
FIG. 14 is a perspective view of a film guide assembly according to an embodiment of the invention.
Figure 15:
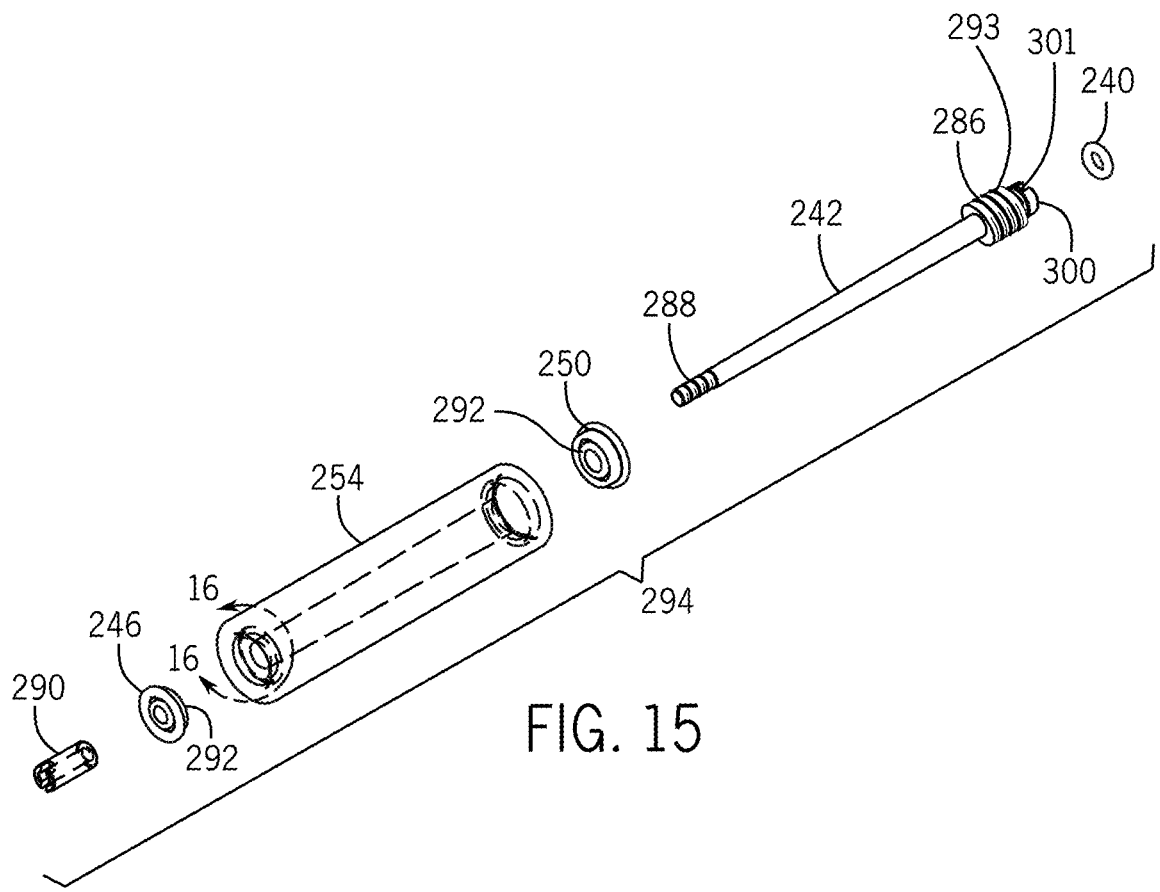
FIG. 15 is an exploded view of a roller bearing assembly usable with the film guide assembly of FIG. 14, according to an embodiment of the invention.

Referring to FIGS. 14 and 15, one element useful to achieve this film positional accuracy is the film guide assembly 302. In some embodiments, the film guide assemblies 302 can include an inside roller 254, a middle roller 256, and an outside roller 258. In some embodiments, ball bearings 246, 250 can be included on some or all rollers 254, 256, 258 to better control the position of the film 404 as it moves in the optical path through the glass plates 260 that define the film plane 304.

It has been observed that known film guide designs allowed the film to wander as it moved through known glass flats of the known film plane. It was identified that this wandering was caused by several factors. The first and most obvious is guide roller end play. The second is that known film guides have only two rollers, one roller that has flanges to restrict film movement along the roller axis, while the other roller did not. With one roller only having guiding flanges, this creates a pivot more easily allowing forces influencing the film to skew the film while being transported through the known film plane. One such force is caused by misalignment of the known supply and take-up film spools with respect to the known film guides. This misalignment typically results in the film being skewed in one direction when moving the film forward and skewing the film in the opposite direction when moving the film in reverse. Another influencing factor is static buildup on the film glass plates. This static build up typically causes the film to adhere to the glass creating varying degrees of friction across the width of the film resulting in it pulling the film in one direction or the other. In some embodiments, a conductive coating (not shown) on the glass plates 260 may be included to reduce or eliminate static build up.

In some embodiments, a portion of film 404 can be loaded into the film guide assembly 302 through a film slot 251. On the bottom side of the film slot 251, there can be a film guide shelf 252, which can aid in the loading of the film 404. Also, at least one of the inside, middle, and outside rollers 254, 256, 258 can have a chamfer 253, which can aid in the loading of the film 404 as well. The middle roller 256 is shown to include the chamfer 253.

In some embodiments, end play can be substantially reduced by using the ball bearings 246, 250. In some embodiments, the ball bearings can be press fit or otherwise secured into or onto one or both ends of any or all of the inside, middle, and outside rollers 254, 256, 258. In some embodiments, an "O" ring 240 can be installed onto an end, e.g., the back end of an axle 242 (see FIG. 15). One end, e.g., a small end of the axle 242 shaft can pass through a threaded hole 270 in the back side of the frame 274, through the roller 254 and bearings 246 and 250, and into a front hole 278 in the frame 274. In some embodiments, rear threads 286 of the axle 242 can be threaded into the threaded holes 270 of the frame 274. A cylindrical nut 290 (some embodiments can include thread locking compound applied) can be passed through the front hole 278 in the frame 274 and threaded onto front threads 288 at the small end of the axle 242. This nut 290 can be lightly tightened, pressing on the inner race 292 of the front bearing 246 and at the same time pressing a shoulder 293 on the back end of the axle 242 against the inner race 292 of the rear bearing 250. This roller bearing assembly 294 as shown in FIG. 15 can substantially reduce or eliminate end play, yet still allow the rollers 254, 256, 258 to spin freely. The thread locking compound, when used, is allowed to cure before the rollers 254, 256, 258 are put into service.

In some embodiments, misalignment between the supply and take-up spools 296, 298 can also be eliminated. The back side of one or more of the three axles 242 (one axle for each of the inside, middle, and outside rollers) can have a groove 300 to accept a retaining member, such as the "O" ring 240, and a slot 301. The slot 301 can accommodate a screw driver and can be used to thread the axle 242 in or out, thereby allowing each of the rollers 254, 256, 258 to be positioned precisely with respect to the supply and take-up spools 296, 298 and with respect to each other. The "O" ring 240 can interfere with the threaded holes 270, thereby providing an axle locking mechanism. This can help to reduce the axle 242 from spinning and thereby go out of adjustment. With the supply spool 296, guide rollers 254, 256, 258, and take-up spool 298 all in alignment, the force of driving the film in the optical path is pulling straight across the optical film plane 304, thereby reducing the tendency of the film to wander.

In some embodiments, the three roller design (e.g., inside, middle, and outside) can further insure film position stability. The majority of image marked film is 16 mm. Due to its narrower width, 16 mm film is more likely to wander than 35 mm film. For 16 mm film, one or both of the film guide assemblies 302 can have one or more rollers, e.g., the outside roller 258 and the middle roller 256, with a guiding flange 266 and/or a recess 268. A guiding flange, e.g., guiding flange 266 as shown on the outside roller 258, can be user positionable between a 16 mm position and a 35 mm position. The 16 mm position can be seen in FIGS. 13 and 14, for example. The middle roller 256 (or any of the outside roller 258 or inside roller 254) can have a recess 268 with a fixed width to accommodate 16 mm film. 35 mm film can ride on the larger diameter of this middle roller 256 with about half of its width extending over the recess 268 for the 16 mm film. In some embodiments, the inside roller 254 does not have a recess or flange, and can be used to establish the film location in the Y axis at the precise level of the optical film plane 304. When using 16 mm film, the film that is most likely to wander, the outside roller 258 and the middle roller 256 with a guiding flange 266 and/or a recess 268 can substantially reduce the pivot point thereby substantially reducing the wandering.

Figure 16:
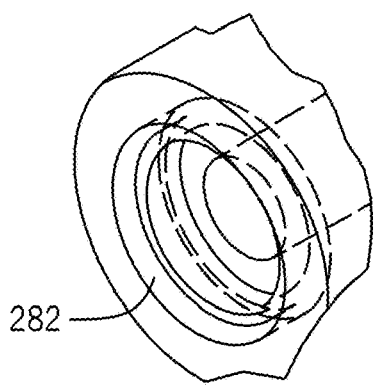
FIG. 16 is a close-up perspective view of an embodiment of a bearing retentive sleeve according to an embodiment of the invention.
Figure 17:
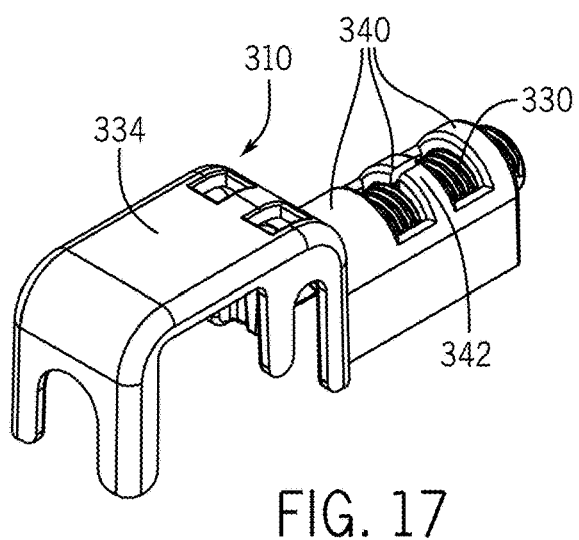
FIGS. 17-20 are various views of a carrier lock assembly according to embodiments of the invention.
Figure 18:
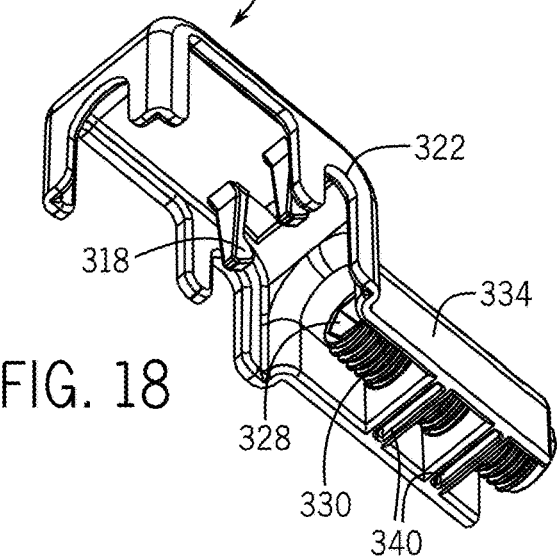
Figure 19:
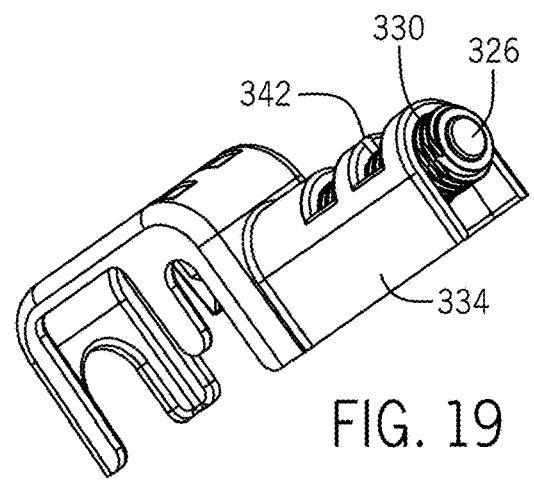
Figure 20:
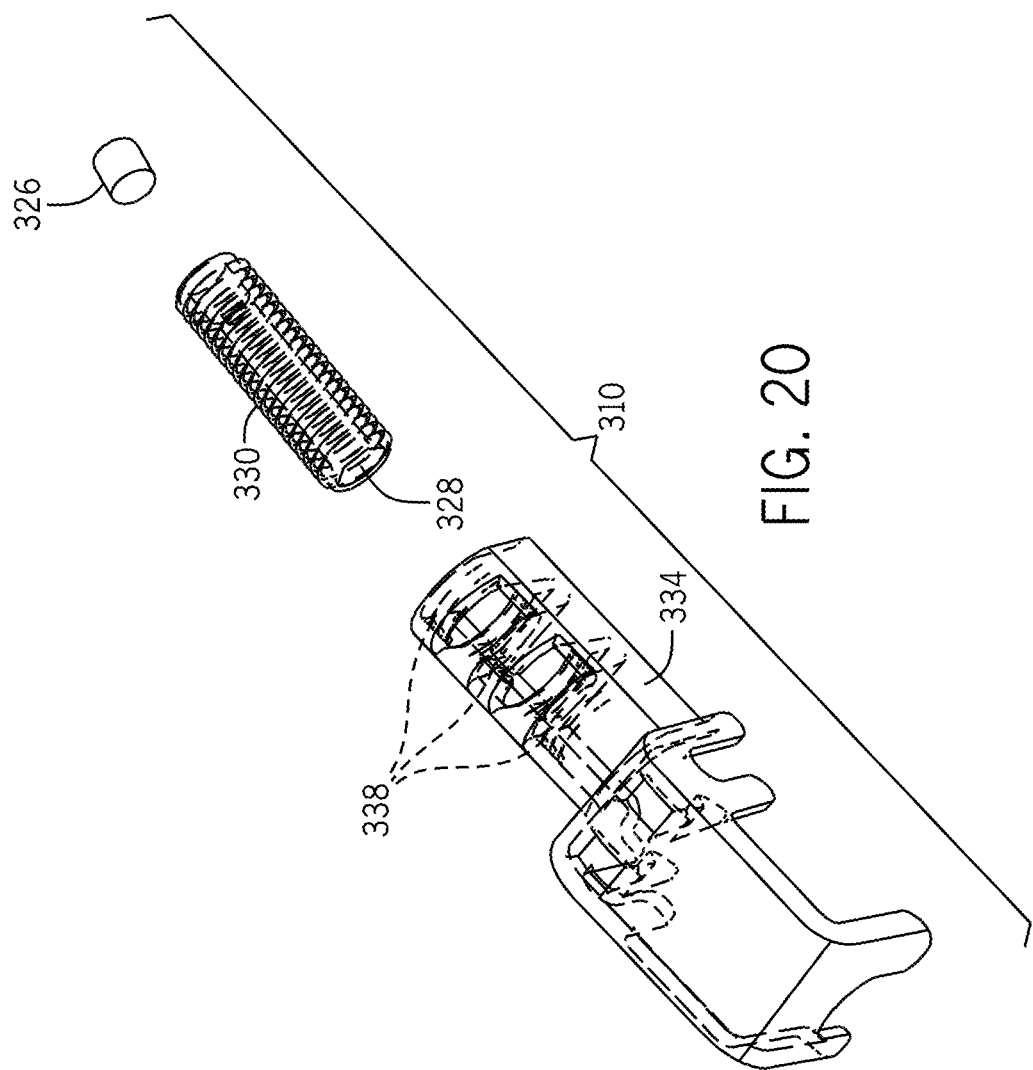

As described above, in some embodiments, to eliminate vibration and rattle, the bearings 246, 250 can be pressed into the ends of one or more of the rollers 254, 256, 258. Press fits in metal and plastic typically require very tight tolerances. If the interference is too great, the bearings 246, 250 may not spin freely. If there is not enough interference, the bearings 246, 250 may be loose, resulting in vibration and rattle as well as possibly falling out during assembly or use. To reduce the need for these tight tolerances, an exemplary 0.015 inch thick bearing retention sleeve 282 can be molded into the ends of each roller 254 (see FIG. 16). It is to be appreciated that thicker and thinner bearing retention sleeves 282 can be used. Because the bearing retention sleeve 282 is generally thin, it can expand, so as to tolerate greater interference without affecting bearing performance and insuring it remains in place and avoids becoming loose.

Referring to FIGS. 13 and 17-20, in some embodiments, a removable microform media support lock assembly 310 can be used. In some embodiments, two media support lock assemblies 310 are used. The media support lock assembly 310 can be used so that the only media support 44 movement is along the Z axis moving from the film loading position (e.g., full out) to the IM sensing position (e.g., partially in). The media support lock assembly can be removed from the DMIA when freedom of movement of the media support 44 is desired, e.g., when the DMIA is to be used with other microforms. As described above, the microform media support 44 can be supported on two rods 62, e.g., 6 mm rods, although other sizes are clearly possible. A media support lock assembly 310 can be held in place with an attachment device, such as a snap(s) 318 and/or yoke(s) 322 snapped down over the rear media support rod 62 (see FIG. 13), with a magnet 326 facing toward the back of the DMIA. When the media support 44 is pushed in, the magnet(s) 326 can contact and attach to a metal wall behind the media support 44. This magnetic force can hold the media support 44 in the IM sensing position. Other retentive features are also possible, such as a clip or a snap that can releasibly maintain the media support 44 in a desired position, e.g., against or attached to a wall or other structure. The width of the DMIA body can be such that when one or more, e.g., two media support lock assemblies 310 are installed, they can restrict movement of the media support 44 in the X axis. With media support lock assemblies installed, movement of the media support 44 can be restricted to movement in the Z axis, from the film loading position to the IM sensing position.

In some embodiments, a socket 328, e.g., a hex socket is shown, of an adjuster 330 can be accessible from the front of the media support lock assembly 310 so precise adjustment can be made possible while viewing an image. Threads 338 within the media support lock assembly body 334 can be formed by five staggered half sections 340, with three on the top and two on the bottom. Other arrangements are possible, such as two on top and three on the bottom, or other quantities, such as four on top and three on the bottom, as non-limiting examples. The threads 338 of the top center half section can be different from the threads 338 of all other half sections in various ways. In some embodiments, the tooth profile can stand higher. The additional thread height can provide interference to hold the adjuster 330 at the adjustment point. The media support lock assembly body 334 can also have a split 342 (see FIGS. 17 and 19) allowing the threads 338 to flex upwards as the adjuster 330 is installed. Without a split 342, the adjuster may jam on the threads 338, making it difficult to assemble and adjust. Once the adjuster 330 is set, further adjustments may not be necessary, although further adjustments are possible.

Figure 24:
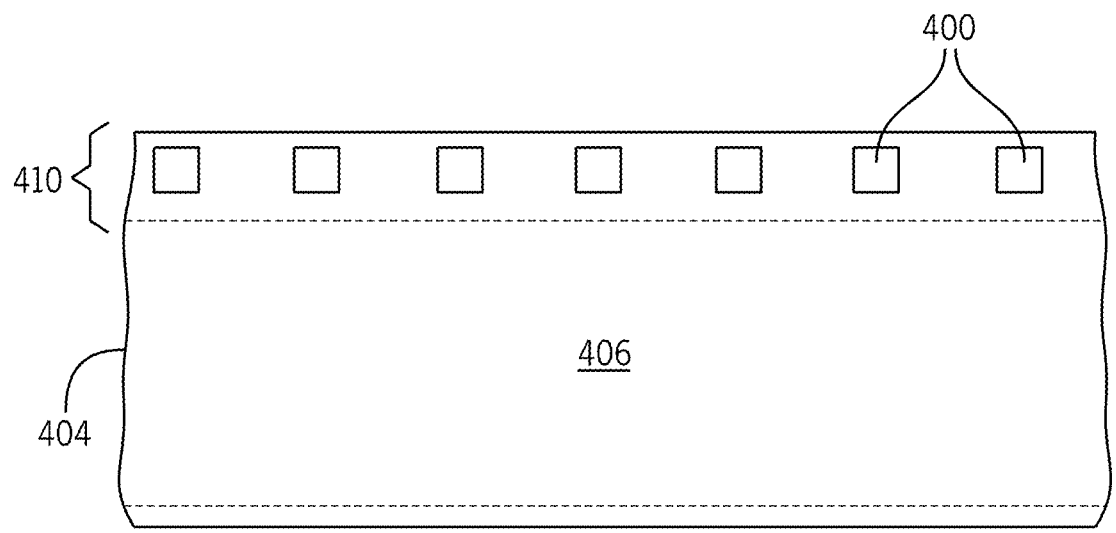
Figure 25:
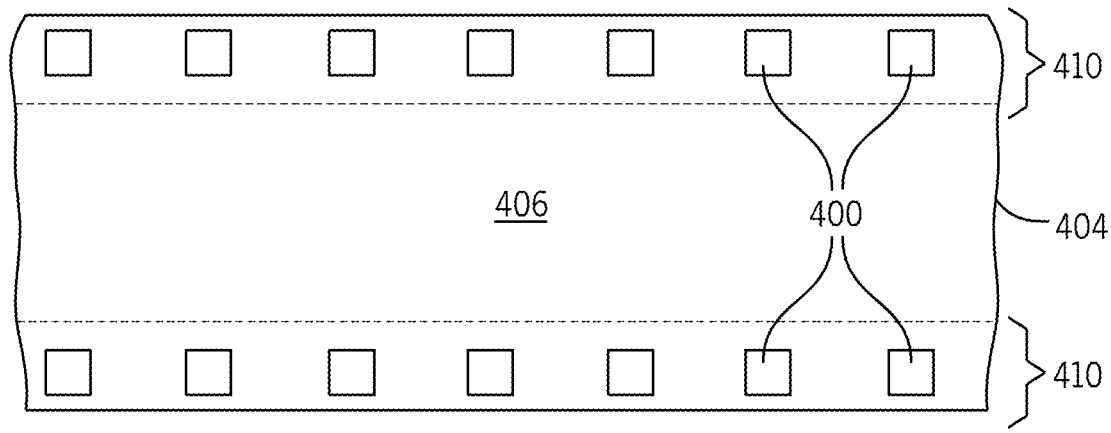
Figure 26:
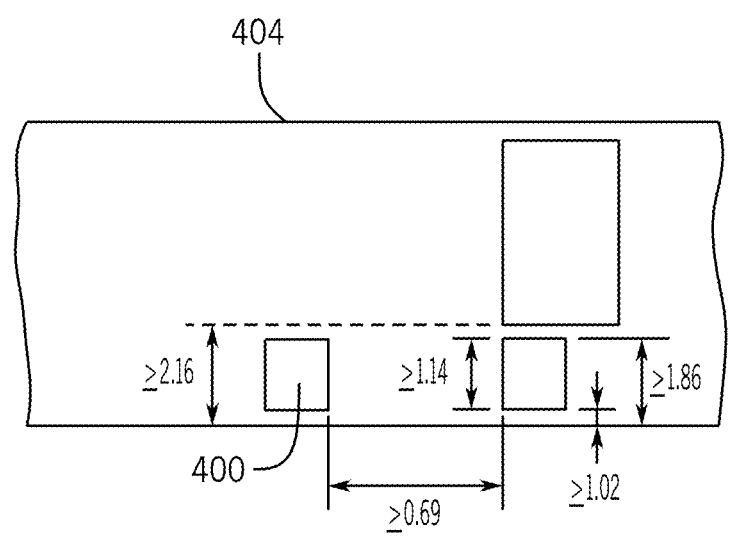
Figure 27:
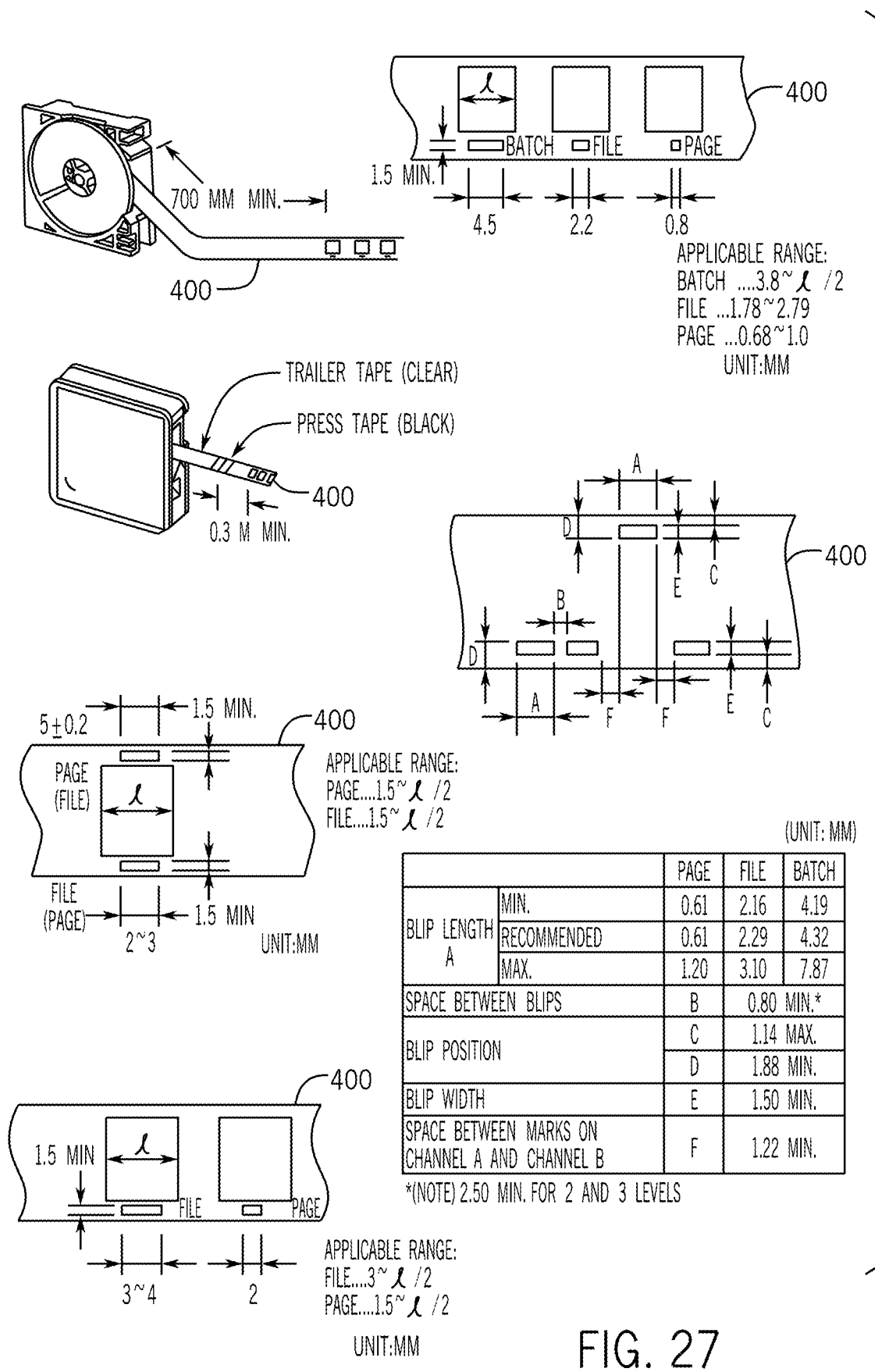

Referring to FIGS. 23-27, IM's 400 of some film 404 appear below the document image space 406 in the IM channel 410 (see FIG. 23), however some film has IM's 400 above the image space 406 in IM channel 410 (see FIG. 24). Some film 404 has image marks 400 both above and below the image space 406. This is referred to a "dual channel" film (see FIG. 25). FIGS. 26 and 27 show non-limiting examples of know dimensional details of various forms of film utilizing IMs 400.

In some embodiments, the area sensor 97 can only support one IM channel 410 at a time with one IM RIO 412 and therefore cannot read both channels simultaneously. In this arrangement, both IM channels can be read but the film requires two passes over the area sensor 97. In other embodiments, the area sensor 97 can support more than one IM channel at a time, e.g., with two IM ROIs 412 and therefore can read both IM channels 410 simultaneously. In some embodiments, the DMIA 236 can allow for the IM ROI 412 to toggle either manually or automatically from one channel to the other.

Figure 28:
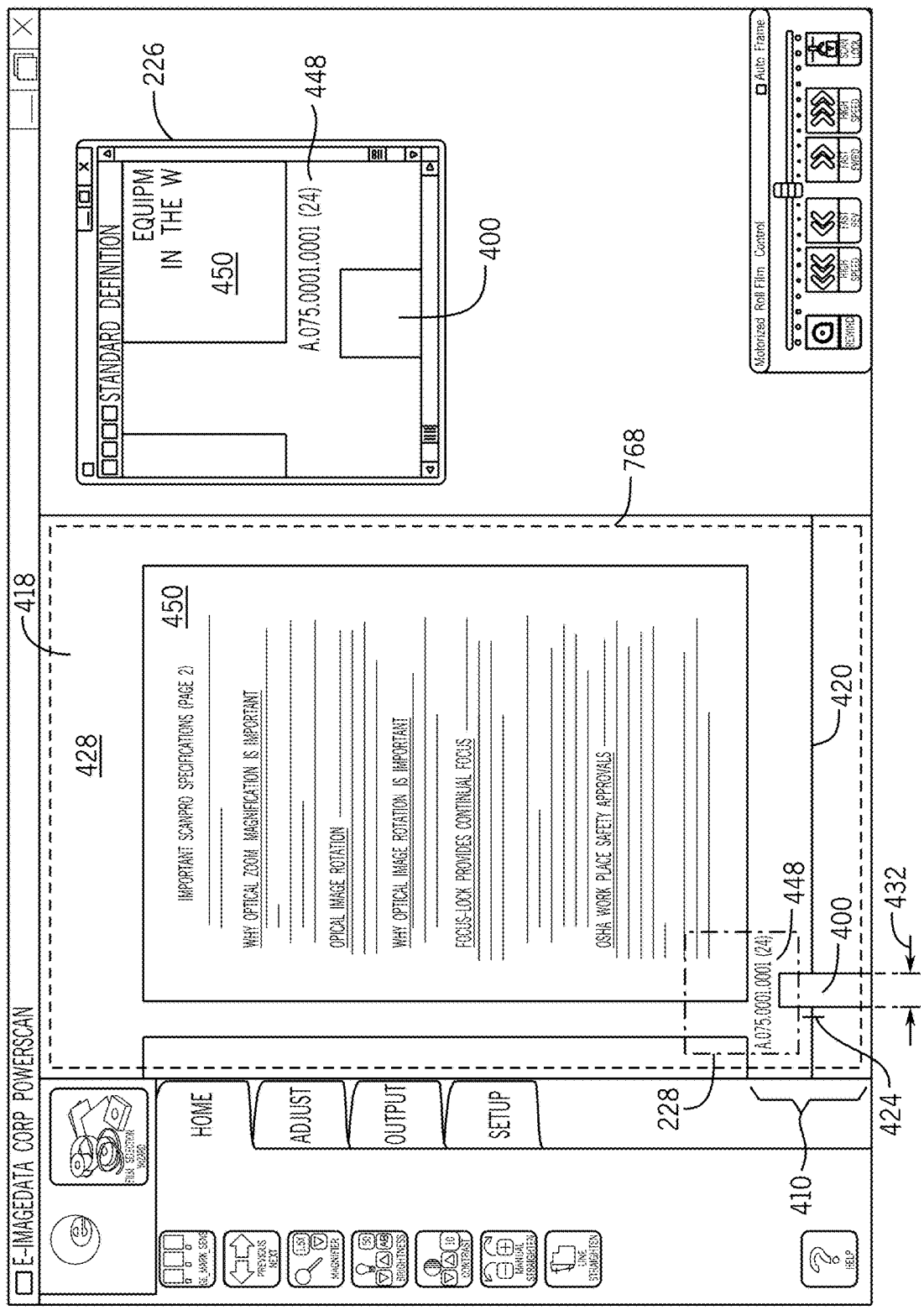
FIGS. 28-31 are screen shots of embodiments of a computer user interface of the digital microform imaging system of FIG. 12 according to embodiments of the invention.

Referring to FIG. 28, in some embodiments, the DMIA 236 can support locational adjustment of the area sensor IM ROI 412, e.g., the width of the IM ROI 412 can be defined and adjusted. The location adjustment of the IM ROI 412 can be used to support the detection of IMs 400 above the document image as well as below the document image (see FIG. 25 for example), and to adjust both speed and accuracy of the DMIA 236.

In some embodiments, the locational adjustment of the IM ROI 412 can be made by a click and drag operation. Referring to FIG. 28, the center (or generally near the center) of the IM channel 410 can be indicated on the image display 418 by a predefined ROI indicator 420, e.g., a red line or a dashed line or a wavy line, as non-limiting examples. When a user clicks and drags on the predefined ROI indicator 420, the ROI indicator 420 can be repositioned up or down (in relation to FIG. 28). In some embodiments, a predefined tick mark 424 (or line, or any other indication) can intersect (or provide a relation to) the predefined ROI indicator 420 (shown horizontal). In some embodiments, the tick mark 424 can be used to indicate a page start or a stop location for the IM 400, meaning, the tick mark 424 can be positioned or repositioned (with a click and drag operation, for example) to indicate to the controller 116 where the IM 400 on the film 404 should be stopped so the image 428 displayed on the image display 418 is in a desired position for the user to view. The predefined tick mark 424 can also be repositionable left or right (in relation to FIG. 28) in a same or similar fashion as the ROI indicator 420 line.

Figure 29:
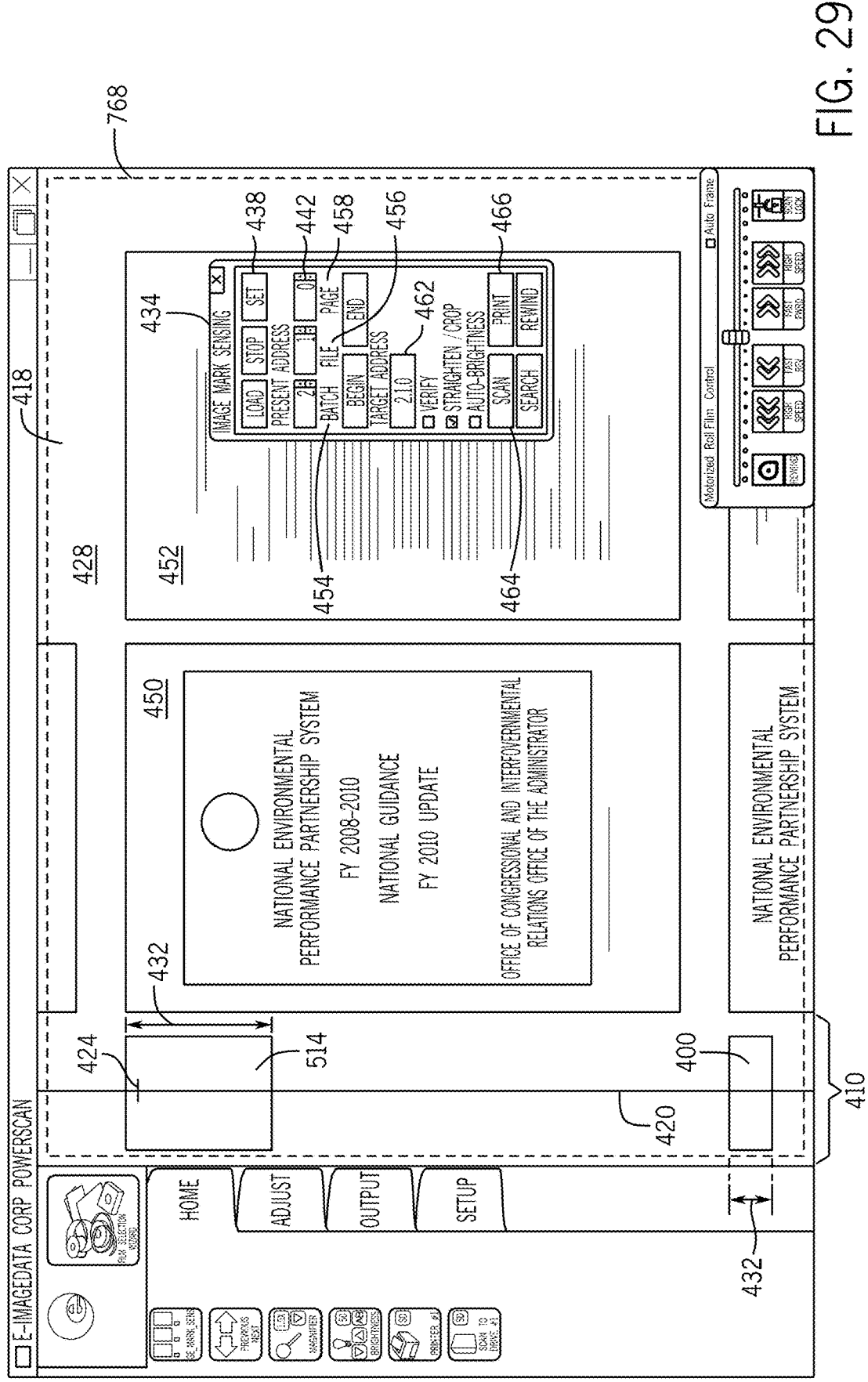

Referring to FIG. 29, in some embodiments, the present page number or address boxes 442 can be used to enter or correct the present address for one or more pages on the film 404. A batch 454, file 456, and page 458 number can be entered into the appropriate window, and/or up and down arrows can be used to increment or decrement the batch 454, file 456, and page 458 numbers. The set button 438 can also be used to define the present page number or address 442. As an example, the first relevant page on the film 404 could be set as page number one. This present page number 442 can then be increased or decreased as the film is advanced or rewound as a tracked page number. This tracked page number can then be compared to an OCR'd page number available on each page to check for accuracy of the position of the film 404, or to check for errors in page numbering. As seen in FIG. 28, the indicator box 228 has been positioned on a position of the image 428 that includes a page number 448 of the document 450 on the film 404. The magnifier window 226 shows page number "(24)". The OCR engine can be used to OCR the page number 448, or any other associated text, to determine a page number as identified in the image 428. The OCR'd page number can then be compared to the tracked page number. If there is a mismatch of pages, the user can be notified, and/or the imaging system 20 can advance or rewind the film 404 to match the OCR'd page number with the tracked page number.

In some embodiments, the imaging system 20 can be configured to not differentiate between different sized IMs. For example, when a film includes three different sized IMs, the typical configuration is to differentiate between the three sizes so the batch 454, file 456 and pages 458 can be detected. Yet, it may be desired to merely count each IM 400 as a page, for example, so each image 428 would only be sequentially identifiable.

In order to request a scan of one or multiple pages 450 from the film 404, a user can access any one of a hard copy or electronic copy of the index for the specific roll of film being viewed. An index can be on a sheet of paper for example, or can be in a spreadsheet file or other database that can electronically communication with the imaging system 20. The user would identify the desired page or pages from the hard copy index, and then enter the desired page or pages in the Image Mark Sensing window 434 for scanning. When multiple pages for scanning are requested, the user can enter the pages in any convenient order in the Target Address box 462 and select the Scan button 464. As non-limiting examples, pages can be entered sequentially, or in groups, or in ranges, or any combination. The imaging system 20 then can advance and rewind the film as needed to sense the IMs 400 for locating the requested pages, acquire an image, and move to the next page until all scans have been completed. The imaging system 20 can acquire images in any order, and then electronically rearrange the scanned images so the images appear in the order requested by the user, for printing (Print button 466) or as an electronic file, for example.

In some embodiments, as the imaging system 20 advances a particular roll of film for the first time and senses the IMs 400 in the IM channel 410, an electronic index can be created to allow the imaging system 20 to "learn" the particular roll of film. The imaging system 20 can generate the electronic index as the roll of film is advanced during use, allowing only a partial electronic index to be generated and stored, e.g., the roll of film does not need to be advanced from start to finish prior to use.

Particularly when multi-level film is used, the imaging system 20 does not know how many batch IMs, file IMs and page IMs are on the film. When the imaging system 20 does not know how many batch 454, file 456, pages 458 are on the film 404, the system can "overshoot" a selected page during the page location process before the imaging system 20 changing direction of the film 404 and returns the desired page. In some embodiments, the DMIA 236 can attempt to decelerate the film 404 as quickly as possible to minimize the amount of overshoot, and the deceleration can take place upon sensing the selected page. In some embodiments, the imaging system 20 is only allowed to overshoot a selected page for a predefined time period (e.g., 0.1 second, 1.0 second, 5 seconds as non-limiting examples). During the page locating process, the film 404 is moving past the area sensor 79 at a high rate of speed, and a width 432 (see FIGS. 28 and 29) of each IM 400 is being sensed to determine if the IM 400 is a batch IM, a file IM, or a page IM, for example.

With the electronic index created for a particular roll of film, the imaging system 20 can now be "intelligent" for the particular roll of film because it is aware of each batch, file and page on the roll of film. The electronic index allows the imaging system 20 to advance and rewind directly to the specific page requested, which improves speed and accuracy of the system 20. The electronic index also allows the imaging system 20 to recognize when a wrong page number is requested and to provide a message to the user. The electronic index can also be integrated with other systems to automate the image retrieval process.

In some embodiments, the Image Mark Sensing window 434 can also include Begin 470 and End 472 buttons. The Begin button 470 can populate the Target Address box 462 with the value of the Present Address 442. Similarly, the End button 472 can populate the Target Address box 462 with the value of the Present Address 442. The Begin and End buttons can be used when the film 404 is mismarked or is poorly marked, or when the index is incorrect, for example.

In some embodiments, the Image Mark Sensing window 434 can also include one or more additional functions. For example, a Verify 476 check box (or any other indication) can be used to require verification that the present address is correct. In some embodiments, this can require a second selection (tap) of the Scan button 464. Other functions can include a Straighten/Crop button 480 and an Auto-Brightness button 482 as non-limiting examples. A Crop box 768 is shown in FIGS. 28 and 29, for example. The Auto-Brightness feature can be used to set the optimal brightness for the IM ROI 412 of the area sensor 97 to read the IMs 400 within the IM channel 410.

Figure 30:
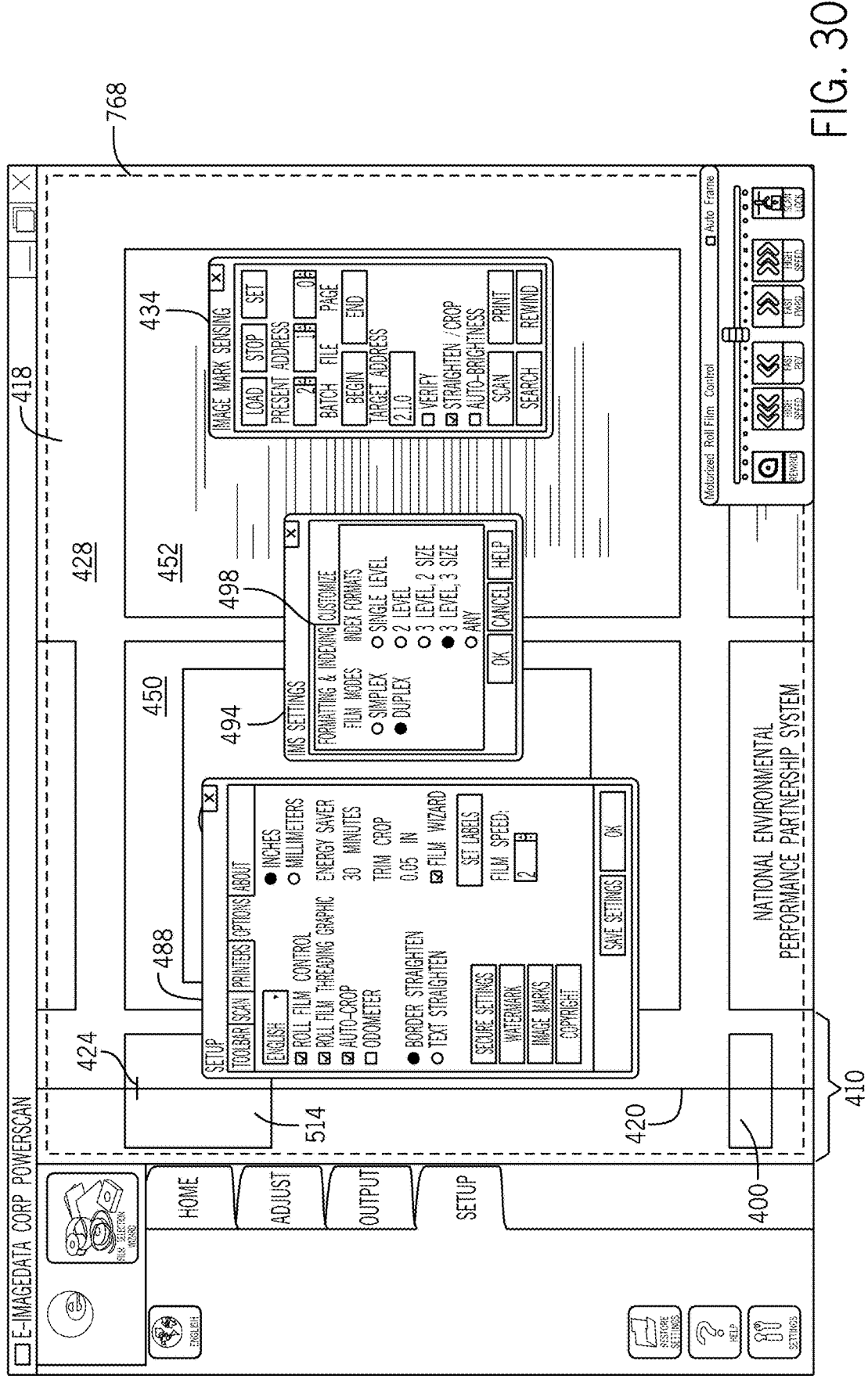
Figure 31:
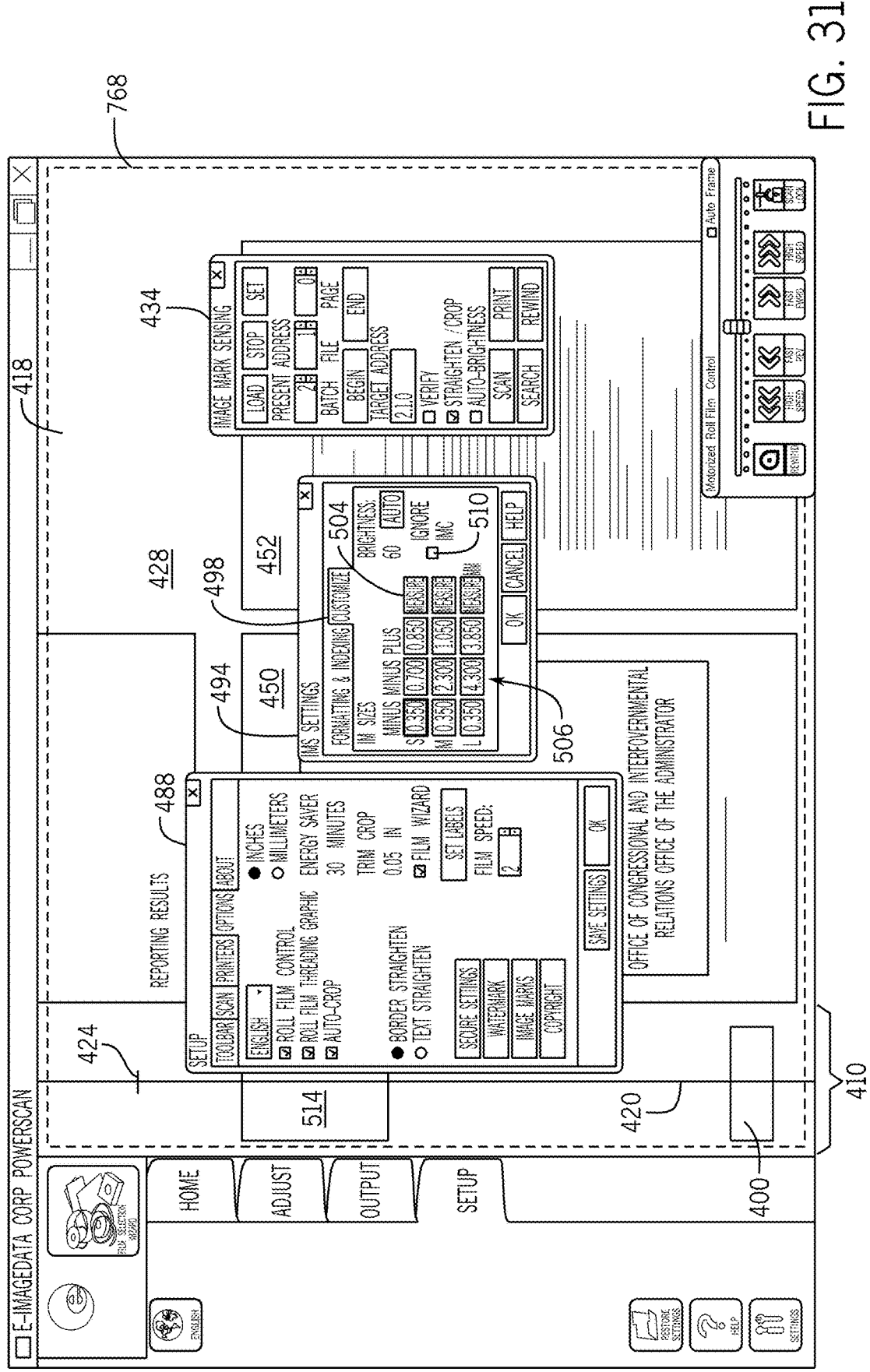

Referring to FIG. 30, in some embodiments, a Setup window 488 can be included to provide access and control of various image mark sensing features and functions. As a non-limiting example, the Image Marks button 490 can be selected to access the IMS Settings window 494. In the IMS Settings window 494, the Formatting & Indexing tab 496 can be used to select Film Modes, e.g., simplex and duplex, and Index Formats, e.g., single, 2, or 3 levels, or customizable. FIGS. 29-31 show an example of a duplex film mode with a three level index format. As can be seen, in the duplex mode, the image 428 displayed on the image display 418 is rotated ninety degrees clockwise. This rotation allows both pages 450, 452, of the document on the film to be oriented for easier viewing. As can be seen, the IM channel 410 has also been rotated to reflect the IM channel relative to the orientation of the pages on the film 404. Also, a small IM 400 can be seen along with a large IM 514. When in the duplex mode, pages 450, 452, for example, can be straighten/cropped for scanning and printing as one or two different pages, and can be electronically stored as a single file or individual files.

Referring to FIG. 31, in some embodiments, the IMS Settings window 494 can include a Customize tab 498. Customize tab 498 can be used to define the size of various IMs 400. In FIG. 31, sizes small, medium and large are shown, although other sizes and nomenclature are possible, e.g., such as batch, file, and page. One or more of the sizes can be automatically measured by selecting the respective Measure button 504, or a range including an acceptable deviation can be defined using the respective data entry fields 506. Allowing a user to define the size, including setting a range of widths, for the various IM sizes allows the user to balance accuracy and speed of the imaging system 20. With a wider predefined width of an IM 400, the IM ROI 412 of the area sensor 97 may require more time to search for the IM 400, but is also more likely to locate an IM 400 in the predefined width 432 area for each IM 400 size. Further, when magnification (either an increase or a reduction) of the film 404 is desired, the predefined width 432 of the IM 400 allows the controller 116 to generally equally adjust the size, e.g., width, of the IM 400 to change with the magnification factor, as can be seen in the magnifier window 226 in FIG. 28.

The Customize tab 498 can also include an Ignore Image Management Code (IMC) check box 510 (or any other indication). Image Management Codes are IM like features within the IM channel 410. In some applications, the Image Management Codes can be ignored, and selecting the IMC check box 510 allows the controller 116 to ignore the IMCs.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of embodiments of the invention. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the invention. Various modifications, changes, and variations apparent to those skilled in the art may be made in the arrangement, operation, and details of the methods and systems of the present invention disclosed herein without departing from the scope of the claimed invention.

We claim:

1. A method for sensing an image mark on a microform using a digital microform imaging apparatus, the apparatus including an area sensor having a pixel array, the area sensor defining an optical axis, the method comprising the steps of:
defining an image mark region of interest within the area sensor that is a subsection of pixels within the pixel array;
receiving the image mark within the image mark region of interest; and
sensing the image mark on the microform.

2. The method of claim 1, wherein the image mark corresponds to an image provided on the microform, the method further comprising:
displaying the image on a screen.

3. The method of claim 1, wherein the image mark has an image mark width and wherein sensing the image mark further includes sensing the image mark width.

4. The method of claim 3, wherein the image mark width relates to a batch number, a file number, or a page number of the microform.

5. The method of claim 1, further comprising:
defining a second image mark region of interest within the area sensor that is a second subsection of pixels within the pixel array;
receiving a second image mark within the image mark region of interest; and
sensing the second image mark on the microform.

6. The method of claim 1, wherein the microform has a plurality of image marks, the method further comprising:
moving the microform through the optical axis; and
maintaining the plurality of image marks within the image mark region of interest.

7. The method of claim 6, wherein maintaining the plurality of image marks within the image mark region of interest is performed by a film guide assembly of the digital microform imaging apparatus.

8. The method of claim 7, wherein the film guide assembly has a frame supporting an outside roller, a middle roller, and an inside roller.

9. The method of claim 8, wherein at least one of the outside roller, the middle roller, or the inside roller has a guiding flange.

10. The method of claim 1, further comprising:
supporting the microform with a media support; and
preventing movement of the media support with a media support lock assembly.

11. The method of claim 10, wherein the media support lock assembly includes a magnet.

12. A digital microform imaging apparatus configured to sense a microform having a plurality of images and a plurality of image marks corresponding to the plurality of images, the digital microform imaging apparatus comprising:
an area sensor having a pixel array, the area sensor defining an optical path, the area sensor configured to sense the plurality of images and the plurality of image marks;
wherein a subsection of the pixel array defines an image mark region of interest in which the plurality of image marks are sensed;
wherein the image marks correspond to at least one of a batch number, a file number, or a page number within the microform; and
a computer interface through which an operator can select an image of the plurality of images to be displayed on a screen by entering at least one of the batch number, the file number, or the page number of the microform on which the image is located.

13. The digital microform imaging apparatus of claim 12, wherein the image marks each have a predefined width respective as to whether the image mark corresponds to a batch number, a file number, or a page number.

14. The digital microform imaging apparatus of claim 12, wherein the image mark region of interest is adjustable to include more or less pixels of the pixel array.

15. The digital microform imaging apparatus of claim 12, wherein the image is sensed with a portion of the pixel array not including the subsection of the pixel array.

16. The digital microform imaging apparatus of claim 12, wherein the area sensor has a gain control configured to adjust the light sensitivity of the area sensor.

17. The digital microform imaging apparatus of claim 12, further comprising a film guide assembly configured to maintain the position of the image marks within the image mark region of interest.

18. The digital microform imaging apparatus of claim 12, further comprising a media support configured to support the microform.

19. The digital microform imaging apparatus of claim 18, wherein the media support includes a magnet.

20. A method for locating an image on a microform using a digital microform imaging apparatus, the apparatus having an area sensor with a pixel array defining an optical path, the method comprising:
receiving at least one of a batch number, a file number, or a page number associated with an image mark and an image on the microform;
using a subsection of the pixel array defining a region of interest, sensing the image mark on the microform; and
displaying the image on a screen.

* * * * *